US012485685B2

(12) United States Patent
Yamashita et al.

(10) Patent No.: US 12,485,685 B2
(45) Date of Patent: Dec. 2, 2025

(54) PRINTING DEVICE

(71) Applicant: SEIKO EPSON CORPORATION, Tokyo (JP)

(72) Inventors: Norihiro Yamashita, Shiojiri (JP); Mafumi Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 160 days.

(21) Appl. No.: 18/475,314

(22) Filed: Sep. 27, 2023

(65) Prior Publication Data

US 2024/0100866 A1 Mar. 28, 2024

(30) Foreign Application Priority Data

Sep. 27, 2022 (JP) ................................ 2022-153845

(51) Int. Cl.
*B41J 3/407* (2006.01)
*B41J 13/16* (2006.01)
*B41J 29/13* (2006.01)

(52) U.S. Cl.
CPC ............. *B41J 13/16* (2013.01); *B41J 3/4078* (2013.01); *B41J 29/13* (2013.01)

(58) Field of Classification Search
CPC ............................ B41J 3/4078; B41J 3/40731
See application file for complete search history.

(56) References Cited

U.S. PATENT DOCUMENTS

2004/0179081 A1* 9/2004 Nimi ........................ B41J 11/06 347/104
2014/0043403 A1* 2/2014 Nakano .................... B41J 29/02 347/85
2021/0276346 A1* 9/2021 Kobayashi ............. B41J 11/008

FOREIGN PATENT DOCUMENTS

JP 2004-276319 A 10/2004

* cited by examiner

*Primary Examiner* — Scott A Richmond
(74) *Attorney, Agent, or Firm* — Dority & Manning, P.A.

(57) ABSTRACT

A printing device includes a printing section and a tray support section. The printing section performs printing on a medium. The tray support section supports a tray. The tray includes a placement surface configured to support the medium. The tray support section includes a positioning section that determines a placement position of the medium with respect to the tray.

7 Claims, 18 Drawing Sheets

PRINTING DEVICE

The present application is based on, and claims priority from JP Application Serial Number 2022-153845, filed Sep. 27, 2022, the disclosure of which is hereby incorporated by reference herein in its entirety.

BACKGROUND

1. Technical Field

The present disclosure relates to a printing device.

2. Related Art

For example, JP-A-2004-276319 discloses a printing device that performs printing on a medium such as a T-shirt. In such a printing device, after the medium is placed on a support surface of a tray outside a housing, the medium can be moved from outside the housing to inside the housing by moving the tray on which the medium is placed in the horizontal direction. Accordingly, after the medium is placed on the support surface outside the housing, printing can be performed on the medium that has moved from outside the housing to inside the housing. Such a tray includes a positioning section that determines a position of the medium, and the medium can be properly placed by supporting the medium along the positioning section.

However, in such a printing device, in order to move the tray in the horizontal direction, a positioning section is provided on the tray itself on which the medium is placed. Therefore, the tray becomes heavy, and it is desirable to reduce weight of the tray in order to stably support the tray.

SUMMARY

The printing device that solves the above-described problem includes a printing section configured to perform printing on a medium and a tray support section that supports a tray including a placement surface configured to support the medium, wherein the tray support section includes a positioning section that determines a placement position of the medium with respect to the tray.

DESCRIPTION OF EMBODIMENTS

First Embodiment

Hereinafter, an embodiment of a printing device will be described. In the following description, a direction intersecting (for example, orthogonal to) a vertical direction Z is defined as a width direction X, and a direction intersecting the vertical direction Z and the width direction X is defined as a forward and rearward direction Y. One of the width directions X is defined as a first width direction X1, and the other of the width directions X is defined as a second width direction X2. One of the forward and rearward direction Y is defined as a forward direction Y1, and the other of the forward and rearward direction Y is defined as a rearward direction Y2. An upward direction of the vertical direction Z is defined as an upward direction Z1, and a downward direction of the vertical direction Z is defined as a downward direction Z2. The width direction X corresponds to an example of a first direction. The forward and rearward direction Y corresponds to an example of a second direction. The vertical direction Z corresponds to an example of an intersecting direction.

Printing Device 10

Figure 1:
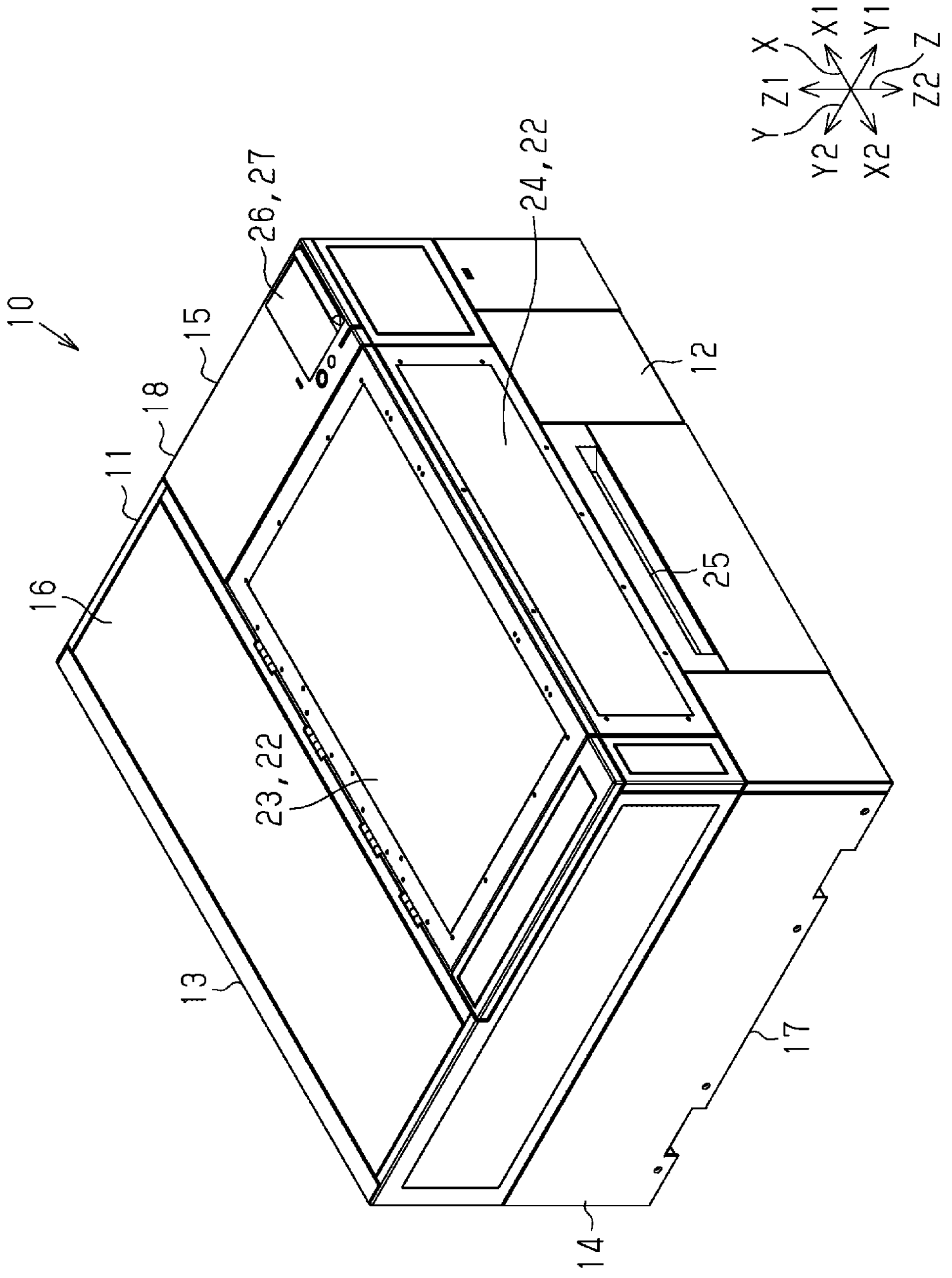
FIG. 1 is a perspective view showing a printing device.

As shown in FIG. 1, a printing device 10 is configured to perform printing on a medium. The printing device 10 may be configured to perform printing on the medium by ejecting liquid. The printing device 10 may be configured to perform printing on a flexible medium such as a T-shirt. The printing device 10 may be configured such that the medium is placed therein by a user.

Housing 11

The printing device 10 includes a housing 11. The housing 11 may have a rectangular shape. The housing 11 includes a front surface 12 facing the forward direction Y1. The housing 11 includes a rear surface 13 facing the rearward direction Y2. The housing 11 includes a left side surface 14 facing the second width direction X2. The housing 11 includes a right side surface 15 facing the first width direction X1. The housing 11 includes a top surface 16 facing the upward direction Z1. The housing 11 includes a bottom surface 17 facing the downward direction Z2. The rear surface 13 is a surface parallel to the front surface 12. The top surface 16 is a surface intersecting the front surface 12 and the rear surface 13. The top surface 16 corresponds to an example of a first surface. The front surface 12 corresponds to an example of a second surface. The rear surface 13 corresponds to an example of a third surface.

Figure 2:
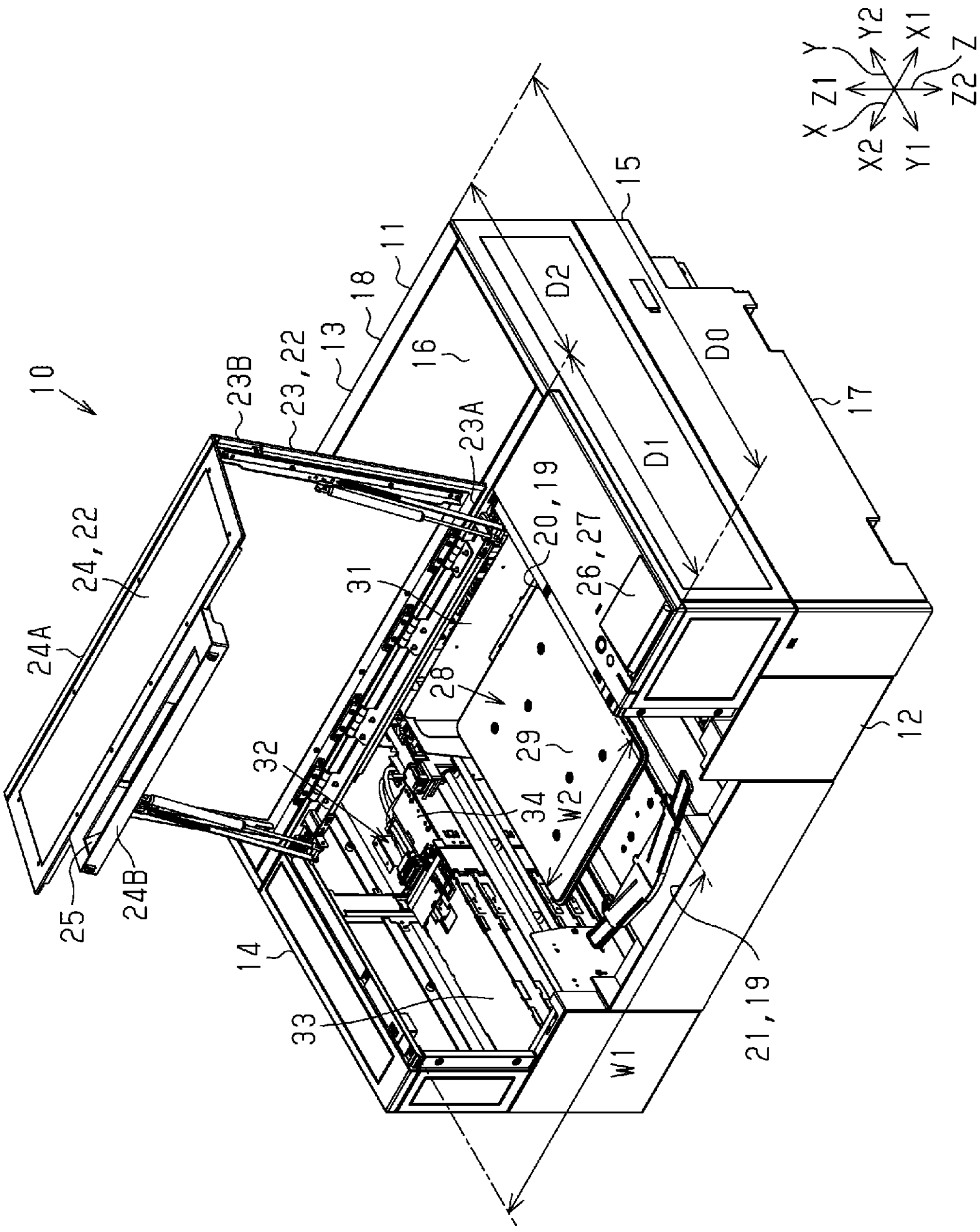
FIG. 2 is a perspective view showing the printing device.
Figure 3:
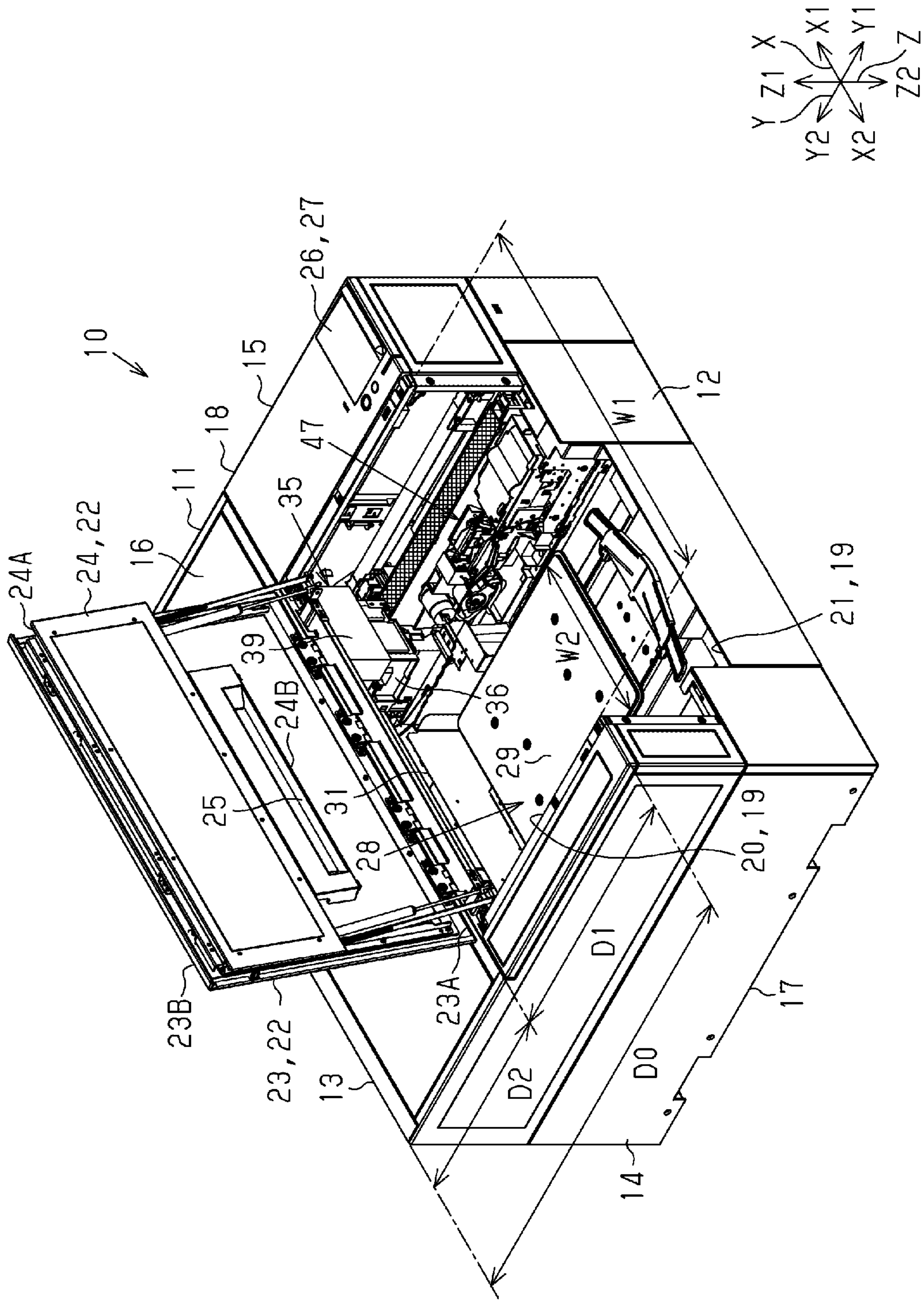
FIG. 3 is a perspective view showing the printing device.

As shown in FIGS. 2 and 3, the housing 11 is configured to accommodate various members included in the printing device 10. In particular, the housing 11 accommodates a medium support section 28, a liquid supply section 32, a printing section 35, and a maintenance section 47, which will be described later.

The housing 11 includes a housing frame 18. The housing frame 18 constitutes an exterior of the housing 11. The housing frame 18 includes an opening section 19. In other words, the housing 11 includes the opening section 19. The opening section 19 is configured to expose various members accommodated in the housing 11. In particular, the opening section 19 is configured to expose a support surface 29 of a medium support section 28 (to be described later).

The opening section 19 includes a first opening section 20 and a second opening section 21. The first opening section 20 is provided in the top surface 16. The second opening section 21 is provided in the front surface 12. The first opening section 20 and the second opening section 21 are provided so as to be continuous. That is, the opening section 19 is provided across the top surface 16 and the front surface 12.

Figure 4:
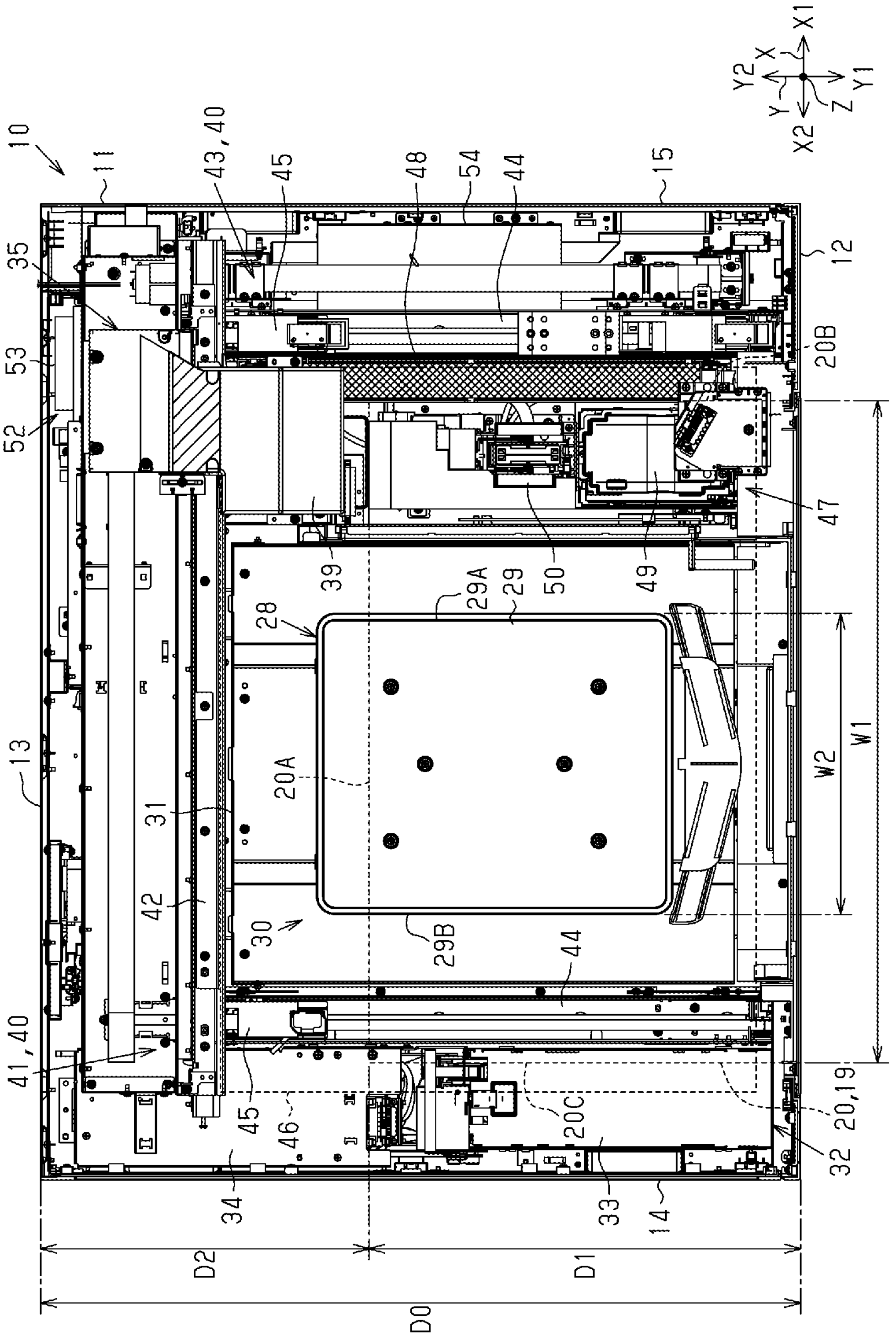
FIG. 4 is a top view showing the printing device.

As shown in FIG. 4, the first opening section 20 is opened between the front surface 12 and a first position 20A in the forward and rearward direction Y in a plan view. The first position 20A is a position separated from the front surface 12 in the rearward direction Y2 by a first distance D1. The first position 20A is a position separated from the rear surface 13 by a second distance D2. The first distance D1 is longer than the second distance D2. In other words, the first position 20A is a position closer to the rear surface 13 than to the front surface 12 in the forward and rearward direction Y. Assuming that a distance between the front surface 12 and the rear surface 13 in the forward and rearward direction Y is DO, the first distance D1 is longer than half of the distance DO.

The first opening section 20 is opened between a second position 20B and a third position 20C in the width direction X in the plan view. The first opening section 20 is opened over a first width W1 with respect to the width direction X in the plan view. The first width W1 is longer than a second width W2 of the support surface 29. Thus, the first opening section 20 has a shape longer than the support surface 29 in the width direction X when viewed from the upward direction Z1.

In particular, as viewed from the upward direction Z1, the second position 20B is located closer to the first width direction X1 side than is a first side end section 29A of the support surface 29. The first side end section 29A is an end section of the support surface 29 in the first width direction X1. As viewed from the upward direction Z1, the third position 20C is located closer to the second width direction X2 side than is a second side end section 29B of the support surface 29. The second side end section 29B is an end section of the support surface 29 in the second width direction X2. Thus, as viewed from the upward direction Z1, the first opening section 20 is opened to positions outside the first side end section 29A and the second side end section 29B in the width direction X.

As shown in FIGS. 2 and 3, the housing 11 includes an opening and closing cover 22. The opening and closing cover 22 can open and close the opening section 19. The opening and closing cover 22 may be made of sheet metal to ensure rigidity. The opening and closing cover 22 includes a first opening and closing cover 23. The first opening and closing cover 23 has a flat plate shape. The first opening and closing cover 23 can open and close the first opening section 20.

The opening and closing cover 22 includes a second opening and closing cover 24. The second opening and closing cover 24 has a flat plate shape. The second opening and closing cover 24 can open and close the second opening section 21. The second opening and closing cover 24 includes a gripping section 25. The gripping section 25 can be gripped by a user. The gripping section 25 is provided at the other end section 24B (to be described later) of the second opening and closing cover 24.

The printing device 10 includes a display section 26 and an operation section 27. The display section 26 is configured to display information. The operation section 27 is configured to be operable by a user. The display section 26 and the operation section 27 may be integrally configured like a touch panel, or may be separately configured. The display section 26 and the operation section 27 are provided on the top surface 16, but are not limited thereto.

Medium Support Section 28

Figure 5:
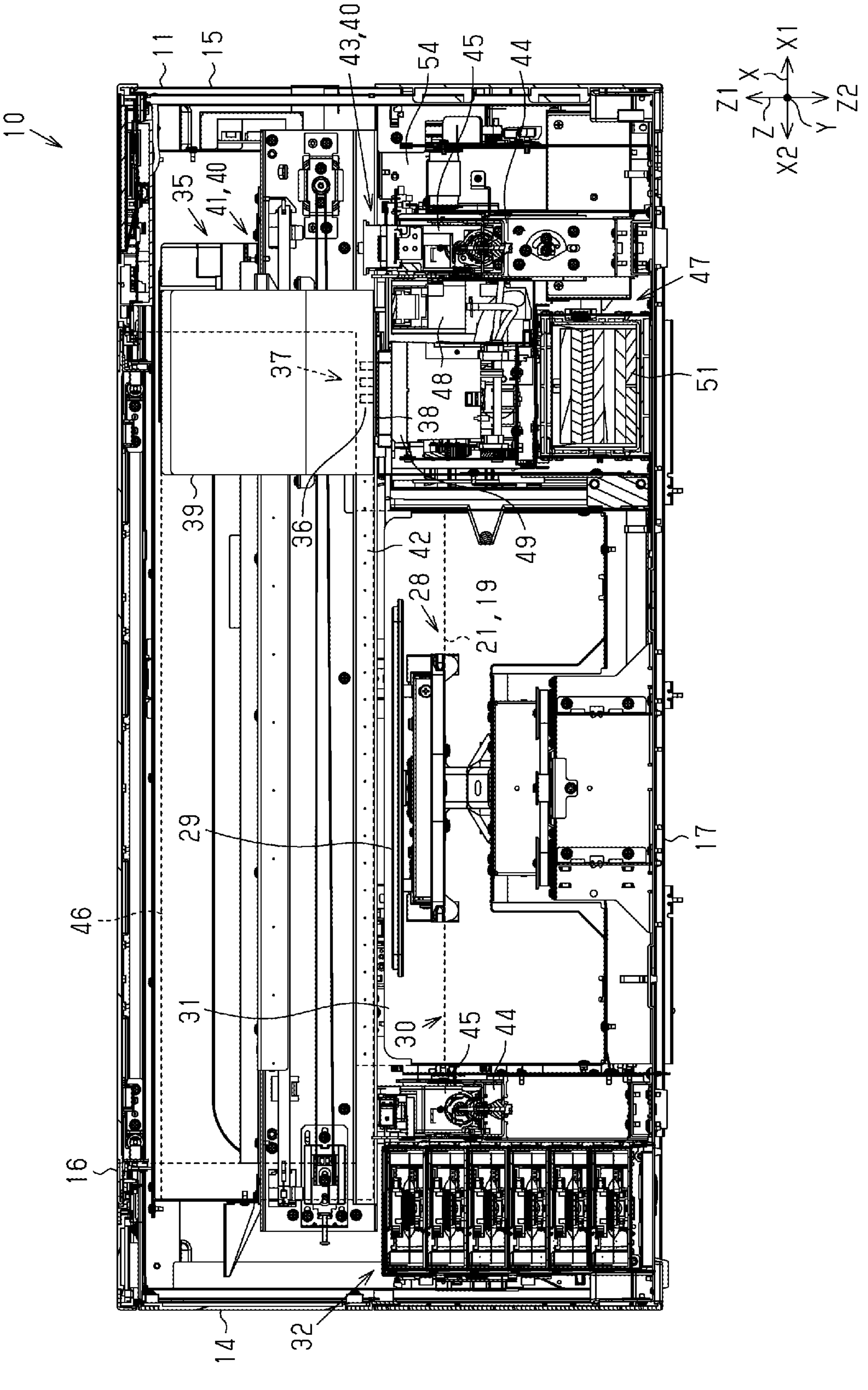
FIG. 5 is a front view showing the printing device.

As shown in FIGS. 4 and 5, the printing device 10 includes a medium support section 28. The medium support section 28 is configured to support the medium. The medium support section 28 includes a support surface 29. The support surface 29 is a surface facing the upward direction Z1. The support surface 29 is configured to support the medium. In particular, the support surface 29 is a surface that supports at least a printed region of the medium. The support surface 29 can also be referred to as a placement surface configured to support the medium. Thus, the support surface 29 is a surface that intersects the front surface 12 and is parallel to the top surface 16.

The medium support section 28 is configured so as not to move in the horizontal direction parallel to the support surface 29. In other words, the support surface 29 is configured not to move in the horizontal direction. The medium support section 28 can adjust a position of the support surface 29 with respect to the vertical direction Z.

The printing device 10 includes a medium accommodation section 30. The medium accommodation section 30 is accommodated in the housing 11. The medium accommodation section 30 is provided at least in the width direction X of the support surface 29, and may also be provided in the forward and rearward direction Y. In a case where a partial region of the medium is supported by the support surface 29, the medium accommodation section 30 can accommodate the partial region of the medium that is not supported by the support surface 29.

In particular, the medium accommodation section 30 includes an accommodation tray 31. The medium accommodation section 30 includes a region divided by the accommodation tray 31. The accommodation tray 31 may partition the medium accommodation section 30 at least on the rearward direction Y2 side of the support surface 29.

Liquid Supply Section 32

The printing device 10 includes a liquid supply section 32. The liquid supply section 32 is provided further in the second width direction X2 than are the medium support section 28 and the medium accommodation section 30. The liquid supply section 32 may be provided along an inner wall surface of the left side surface 14. The liquid supply section 32 is configured to supply liquid to a head 36 (to be described later).

The liquid supply section 32 includes a liquid container 33 and a liquid supply drive section 34. The liquid container 33 is configured to contain liquid to be supplied to the head 36. The liquid container 33 may be a cartridge type which is detachable and attachable, or may be a tank type which can be replenished with liquid. A top surface of the liquid container 33 may be flat.

The liquid supply drive section 34 is driven to supply liquid contained in the liquid container 33 to the head 36. The liquid supply drive section 34 may include a liquid supply pump. A top surface of the liquid supply drive section 34 may be flat.

Printing Section 35

The printing device 10 includes a printing section 35. The printing section 35 is configured to perform printing on the medium. In particular, the printing section 35 is configured to perform printing on the medium supported by the support surface 29.

The printing section 35 includes a head 36. The head 36 can eject liquid onto the medium supported by the support surface 29. The head 36 includes a plurality of nozzles 37 and a nozzle surface 38. The nozzle surface 38 is a surface facing the downward direction Z2. The nozzle surface 38 is a surface in which each of the plurality of nozzles 37 is opened. Each of the plurality of nozzles 37 can eject liquid.

The printing section 35 includes a carriage 39. The carriage 39 is configured to support the head 36. The head 36 is configured as a serial type, but may be configured as a line type. In the serial type, printing is performed while the head 36 moves in the width direction X. In the line type, the head 36 is provided spanning the width direction X.

The printing section 35 includes a head movement section 40. The head movement section 40 is configured to move the carriage 39. That is, the head movement section 40 is configured to move the head 36. The head movement section 40 is configured to move the head 36 in the horizontal direction. Specifically, the head movement section 40 is configured to move the head 36 in the width direction X and the forward and rearward direction Y.

The head movement section 40 includes a first head movement section 41. The first head movement section 41 is configured to move the carriage 39 in the width direction X. That is, the first head movement section 41 is configured to move the head 36 in the width direction X.

The first head movement section 41 includes a first guide section 42. The first guide section 42 is configured to extend in the width direction X across the support surface 29. The first guide section 42 guides the carriage 39 so as to be movable along the width direction X.

The head movement section 40 includes a second head movement section 43. The second head movement section 43 is configured to support the first head movement section 41. The second head movement section 43 is configured to move the first head movement section 41 in the forward and rearward direction Y. That is, the second head movement section 43 is configured to move the head 36 in the forward and rearward direction Y. In a case where the head 36 is a line type, the head movement section 40 may include only the second head movement section 43 without including the first head movement section 41.

The second head movement section 43 includes a pair of second guide sections 44. The pair of second guide sections 44 are provided in the first width direction X1 and the second width direction X2 of the medium support section 28 with the medium support section 28 interposed therebetween. Each of the pair of second guide sections 44 is configured to extend in the forward and rearward direction Y.

The second head movement section 43 includes a pair of support sections 45. The pair of support sections 45 are provided in the first width direction X1 and the second width direction X2 of the medium support section 28 with the medium support section 28 interposed therebetween. Each of the pair of support sections 45 is configured to support the first head movement section 41. The pair of support sections 45 are movable in the forward and rearward direction Y along the corresponding pair of second guide sections 44. Thus, the head movement section 40 is mounted with the head 36 and is movable in the horizontal direction across the medium support section 28. The head movement section 40 is configured in a gate shape in a front view.

The head movement section 40 can move the head 36 within a movement range 46. The movement range 46 of the head 36 includes a facing position and a retreat position. The facing position is a position where the nozzle surface 38 faces the support surface 29. The retreat position is a position where the nozzle surface 38 does not face the support surface 29. The retreat position includes a standby position. The standby position is a position where the head 36 is arranged when printing is not performed. The standby position may be located on the first width direction X1 side and on the rearward direction Y2 side of the movement range 46. The retreat position includes a maintenance position. The maintenance position is a position where the nozzle surface 38 faces the maintenance section 47 (to be described later). That is, the movement range 46 of the head 36 includes the maintenance position.

Maintenance Section 47

The printing device 10 includes a maintenance section 47. The maintenance section 47 is provided further in the first width direction X1 than are the medium support section 28 and the medium accommodation section 30. The maintenance section 47 is arranged at a position that does not overlap the medium support section 28 and the medium accommodation section 30 in the vertical direction Z. The maintenance section 47 is configured to maintain the head 36.

As shown in FIG. 4, the maintenance section 47 includes a flushing section 48. The flushing section 48 is configured to receive liquid ejected from the head 36. The flushing section 48 is configured to extend in the forward and rearward direction Y. The flushing section 48 is arranged at a position that does not overlap the medium support section 28 and the medium accommodation section 30 in the vertical direction Z.

The maintenance section 47 includes a wiping section 49. The wiping section 49 can wipe the nozzle surface 38. The wiping section 49 is arranged at a position that does not overlap the medium support section 28 and the medium accommodation section 30 in the vertical direction Z.

The maintenance section 47 includes a suction section 50. The suction section 50 is configured to suck liquid from the head 36. The suction section 50 may include a suction pump that sucks liquid from the head 36. The suction section 50 is arranged at a position that does not overlap the medium support section 28 and the medium accommodation section 30 in the vertical direction Z.

As shown in FIG. 5, the maintenance section 47 includes a waste liquid tank 51. The waste liquid tank 51 is configured to store liquid received by the flushing section 48. The waste liquid tank 51 is configured to store liquid sucked by the suction section 50. The waste liquid tank 51 is arranged at a position that does not overlap the medium support section 28 and the medium accommodation section 30 in the vertical direction Z. The waste liquid tank 51 is arranged at a position that overlaps the flushing section 48 in the vertical direction Z. The waste liquid tank 51 is arranged at a position that overlaps the wiping section 49 in the vertical direction Z. The waste liquid tank 51 is arranged at a position that overlaps the suction section 50 in the vertical direction Z.

Control Substrate 52 and Power Supply Unit 54

As shown in FIG. 4, the printing device 10 includes a control substrate 52. The control substrate 52 is accommodated in the housing 11. The control substrate 52 may be provided along an inner wall surface of the rear surface 13.

The control substrate 52 is a substrate on which various electronic components for controlling the printing device 10 are mounted.

The control substrate 52 includes a control section 53. The control section 53 controls the printing device 10. The control section 53 controls various operations executed by the printing device 10. The control section 53 can be configured as a circuit including a: one or more processors which execute various processes according to a computer program, one or more dedicated hardware circuits which execute at least some of various processes, or y: a combination thereof. The hardware circuit is, for example, an application specific integrated circuit. The processor includes a CPU and memory, such as RAM and ROM, which stores program code or instructions configured to cause the CPU to perform processing. The memory, that is, the computer-readable medium, includes any readable medium that can be accessed by a general purpose or special purpose computer.

The printing device 10 includes a power supply unit 54. The power supply unit 54 is accommodated in the housing 11. The power supply unit 54 may be provided along an inner wall surface of the right side surface 15. The power supply unit 54 is configured to supply power to the printing device 10.

Electrical Configurations of Printing Device 10

Next, electrical configurations of the printing device 10 will be described with reference to FIG. 6.

Figure 6:
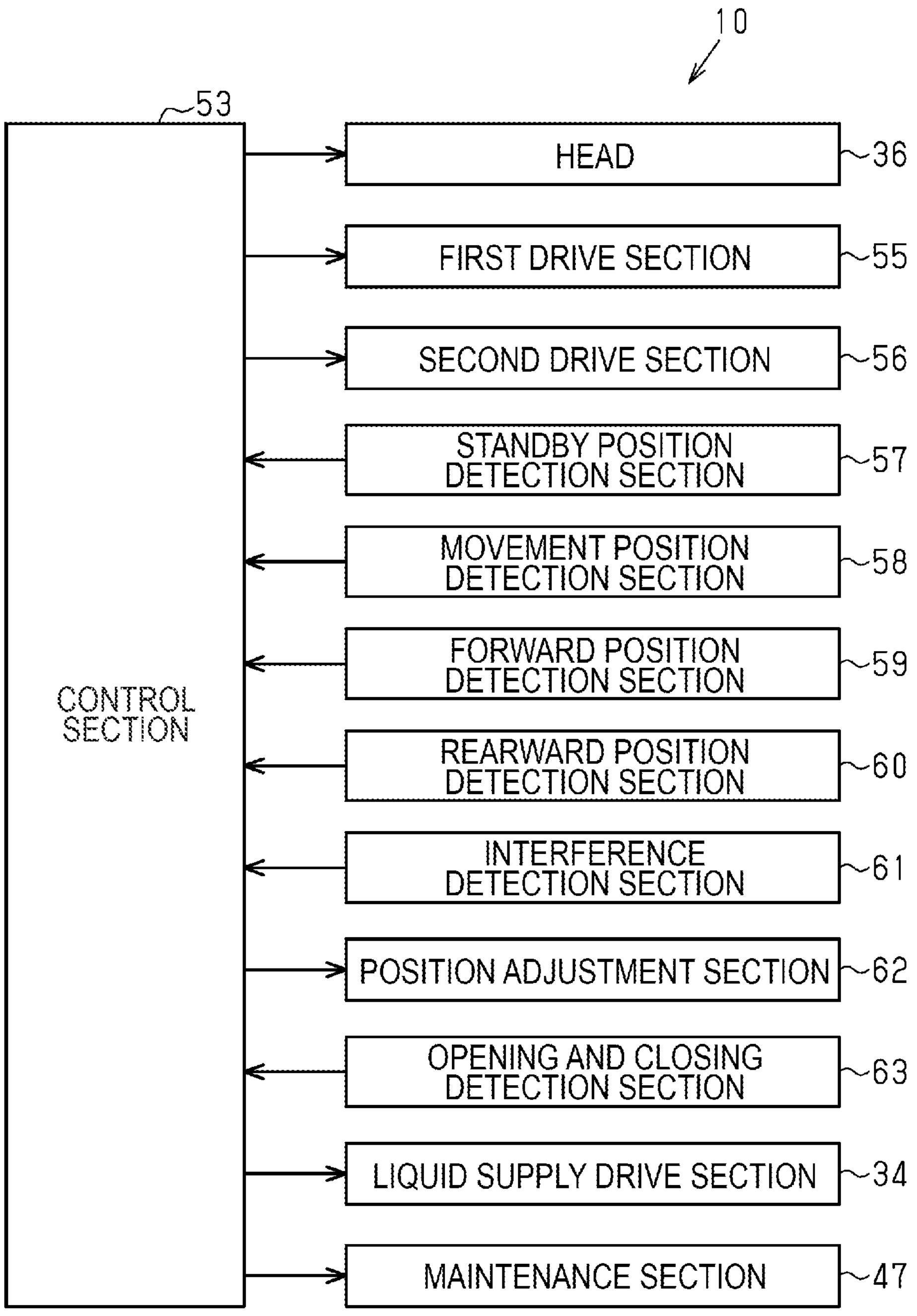
FIG. 6 is a block diagram showing an electrical configuration of the printing device.

As shown in FIG. 6, the printing device 10 includes a first drive section 55. The first drive section 55 is a drive source that moves the carriage 39 along the width direction X. The first drive section 55 may include the first head movement section 41.

The printing device 10 includes a second drive section 56. The second drive section 56 is a drive source that moves the first head movement section 41 along the forward and rearward direction Y. The second drive section 56 may be provided in the second head movement section 43.

The printing device 10 includes a standby position detection section 57. The standby position detection section 57 can detect that the head 36 is arranged at the standby position. The standby position detection section 57 may be provided in the first head movement section 41.

The printing device 10 includes a movement position detection section 58. The movement position detection section 58 can detect a position where the head 36 moving in the width direction X is arranged. The movement position detection section 58 may be provided in the first head movement section 41.

The printing device 10 includes a forward position detection section 59. The forward position detection section 59 can detect that the head 36 is arranged at the foremost position. The forward position detection section 59 may be provided in the second head movement section 43.

The printing device 10 includes a rearward position detection section 60. The rearward position detection section 60 can detect that the head 36 is arranged at the rearmost position. The rearward position detection section 60 may be provided in the second head movement section 43.

The printing device 10 includes an interference detection section 61. The interference detection section 61 can detect whether an object interferes with the head 36. The interference detection section 61 may be provided in the second head movement section 43. The interference detection section 61 may include a light projecting section and a light receiving section (not shown). The light projecting section and the light receiving section are provided in the pair of second guide sections 44.

The printing device 10 includes a position adjustment section 62. The position adjustment section 62 is configured to adjust a position of the support surface 29 in the vertical direction Z. The position adjustment section 62 may be provided in the medium support section 28. The position adjustment section 62 may be configured to adjust a position of the accommodation tray 31 in the vertical direction Z.

The printing device 10 includes an opening and closing detection section 63. The opening and closing detection section 63 can detect the opening and closing state of the first opening and closing cover 23. In other words, the opening and closing detection section 63 can detect the opening and closing state of the opening and closing cover 22. The opening and closing detection section 63 is provided on an inner wall surface with respect to the top surface 16, but is not limited thereto.

The control section 53 is connected to the head 36, the first drive section 55, the second drive section 56, the position adjustment section 62, the liquid supply drive section 34, and the maintenance section 47. The control section 53 controls the head 36, the first drive section 55, the second drive section 56, the position adjustment section 62, the liquid supply drive section 34, and the maintenance section 47 by supplying drive signals.

The control section 53 is connected to the standby position detection section 57, the movement position detection section 58, the forward position detection section 59, the rearward position detection section 60, the interference detection section 61, and the opening and closing detection section 63. The control section 53 can receive detection signals from the standby position detection section 57, the movement position detection section 58, the forward position detection section 59, the rearward position detection section 60, the interference detection section 61, and the opening and closing detection section 63.

The control section 53 performs various kinds of control based on the detection signals. As a specific example, the control section 53 may stop printing when the opening and closing detection section 63 detects that the opening and closing cover 22 is open while printing is performed.

Detailed Configuration of Housing 11

Here, a detailed configuration of the housing 11 will be described.

Figure 7:
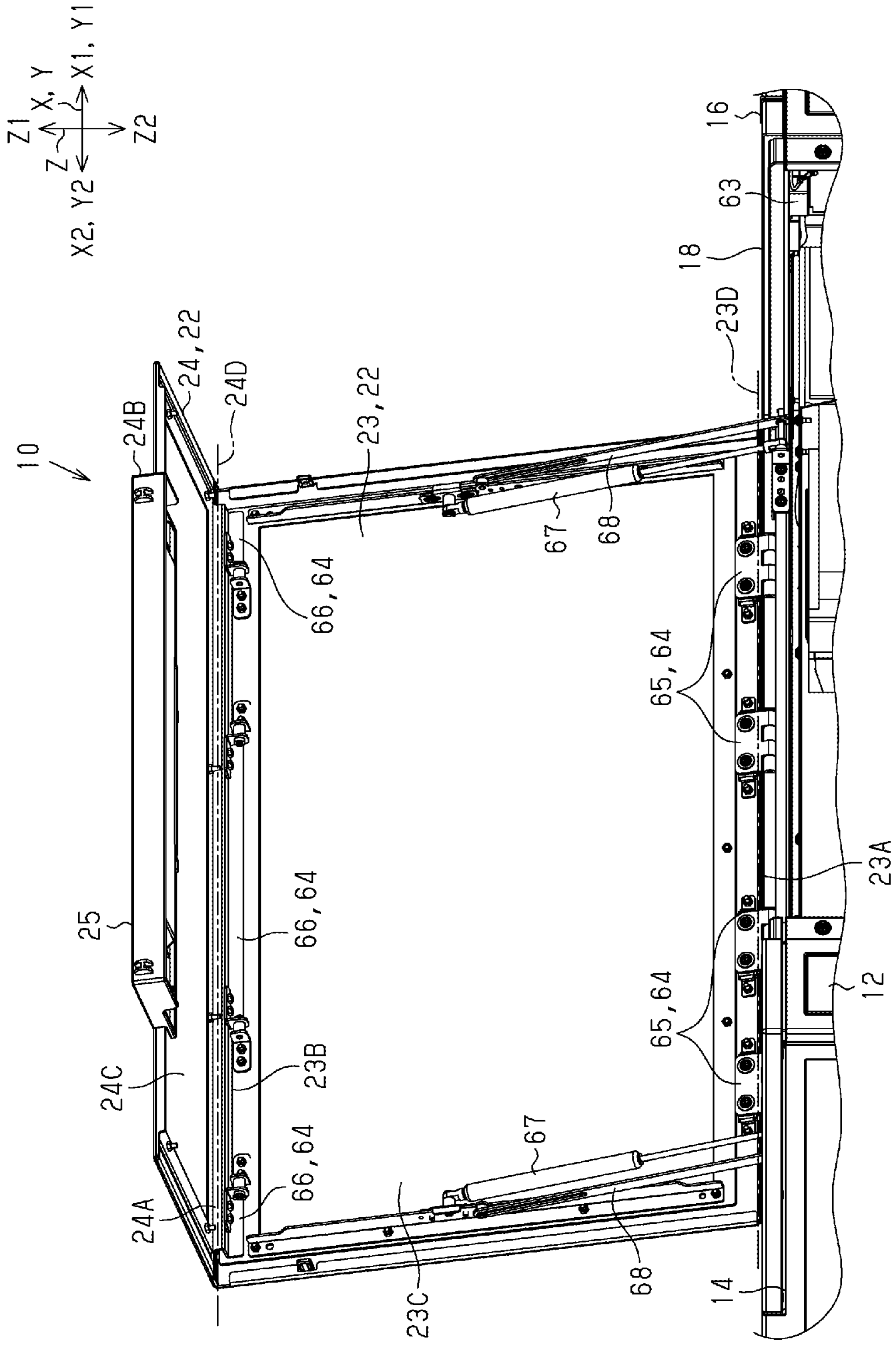
FIG. 7 is a perspective view showing the printing device.
Figure 8:
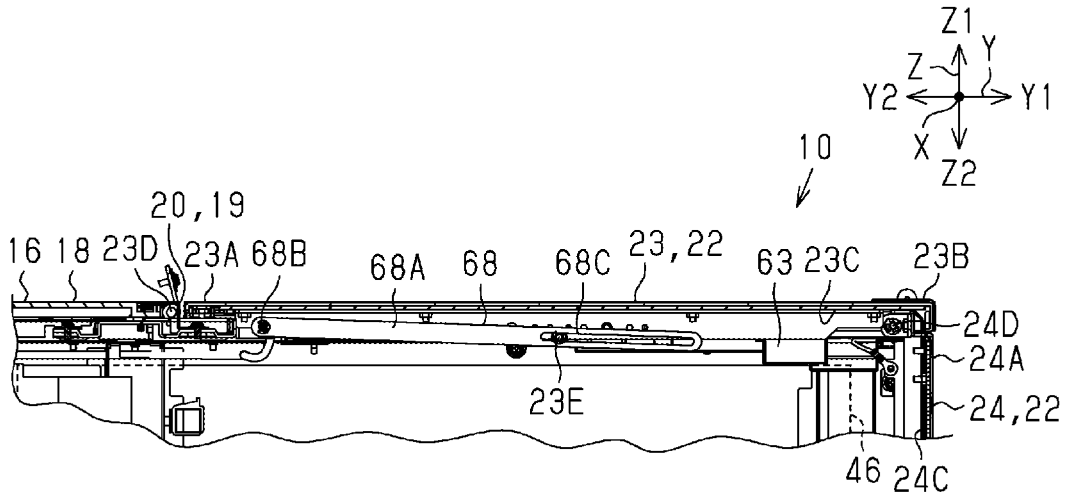
FIG. 8 is a cross-sectional view showing an opening and closing cover.
Figure 9:
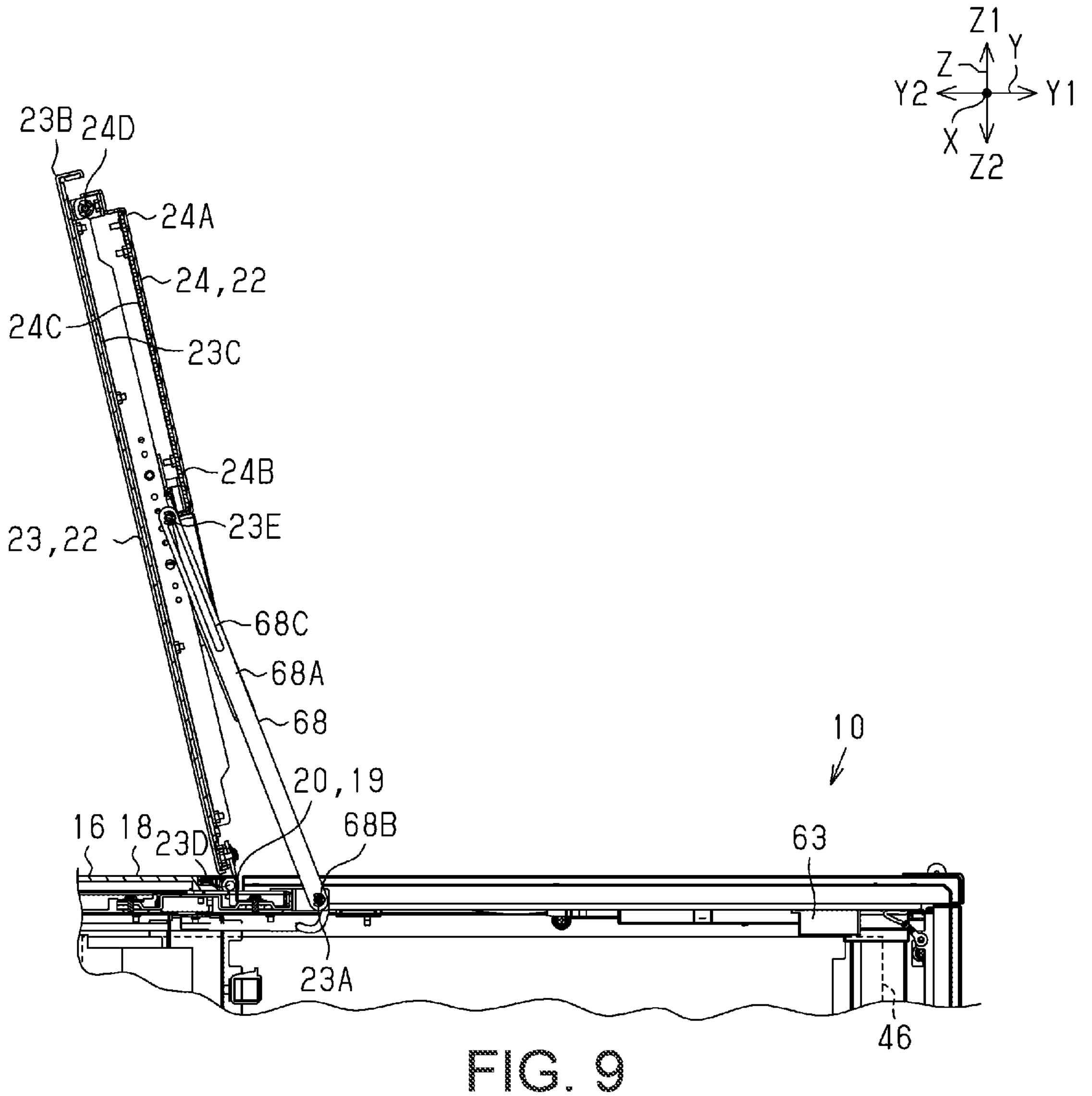
FIG. 9 is a cross-sectional view showing the opening and closing cover.

As shown in FIGS. 7 to 9, the first opening and closing cover 23 includes one end section 23A and an other end section 23B. The one end section 23A is an end section located on the rearward direction Y2 side of the first opening and closing cover 23 in a state where the first opening and closing cover 23 closes the first opening section 20. The other end section 23B is an end section located on the forward direction Y1 side of the first opening and closing cover 23 in the state where the first opening and closing cover 23 closes the first opening section 20.

The first opening and closing cover 23 includes an inner surface 23C. The inner surface 23C is a surface facing inside the printing device 10 in a state where the first opening and closing cover 23 closes the first opening section 20. In other words, the inner surface 23C is a surface facing the downward direction Z2 in the state where the first opening and closing cover 23 closes the first opening section 20.

The second opening and closing cover 24 includes one end section 24A and an other end section 24B. The one end section 24A is an end section located on the upward direction Z1 side of the second opening and closing cover 24 in a state where the second opening and closing cover 24 closes the second opening section 21. The other end section 24B is an end section located on the downward direction Z2 side of the second opening and closing cover 24 in the state where the second opening and closing cover 24 closes the second opening section 21.

The second opening and closing cover 24 includes an inner surface 24C. The inner surface 24C is a surface facing inside the printing device 10 in the state where the second opening and closing cover 24 closes the second opening section 21. In other words, the inner surface 24C is a surface facing the rearward direction Y2 in the state where the second opening and closing cover 24 closes the second opening section 21.

As shown in FIG. 7, the printing device 10 includes connection sections 64. The connection sections 64 are configured to connect the members constituting the housing 11. The connection sections 64 includes first connection sections 65. The first connection sections 65 are configured to connect the housing frame 18 and the first opening and closing cover 23. The first connection sections 65 may be rotary hinges. The connection sections 64 includes second connection sections 66. The second connection sections 66 are configured to connect the first opening and closing cover 23 and the second opening and closing cover 24. The second connection sections 66 may be folding hinges.

The one end section 23A of the first opening and closing cover 23 is connected to the housing frame 18 at the top surface 16 by the first connection sections 65. That is, the first opening and closing cover 23 is connected to the top surface 16 by the first connection sections 65.

The first opening and closing cover 23 is connected to the housing frame 18 so as to be rotatable about a first axis 23D. The first axis 23D extends along the width direction X. Thus, the first connection sections 65 connect the top surface 16 and the one end section 23A of the first opening and closing cover 23 to the top surface 16 such that the first opening and closing cover 23 is pivotable about the first axis 23D. The first axis 23D is located at an end of the top surface 16 on the rearward direction Y2 side where the first opening section 20 is formed. Therefore, the first axis 23D is provided at a position closer to the rear surface 13 than to the front surface 12. The first opening section 20 is opened between the front surface 12 and the first axis 23D in the forward and rearward direction Y.

The one end section 24A of the second opening and closing cover 24 is connected to the other end section 23B of the first opening and closing cover 23 by a second connection section 66. That is, the second opening and closing cover 24 is connected to the first opening and closing cover 23 by the second connection section 66.

The second opening and closing cover 24 is connected to the first opening and closing cover 23 so as to be rotatable about a second axis 24D. The second axis 24D extends along the width direction X. Thus, the second connection sections 66 connect the other end section 23B of the first opening and closing cover 23 and the one end section 24A of the second opening and closing cover 24 such that the second opening and closing cover 24 is pivotable about the second axis 24D. When the opening and closing cover 22 opens the opening section 19, the inner surface 23C of the first opening and closing cover 23 and the inner surface 24C of the second opening and closing cover 24 can be folded so as to face each other.

The printing device 10 includes gas springs 67. The gas springs 67 are connected to the housing frame 18 and the first opening and closing cover 23. The gas springs 67 are provided along both end sections in the width direction X of the first opening and closing cover 23. The gas springs 67 adjust the opening and closing operation of the first opening and closing cover 23. The gas springs 67 apply forces in a direction in which the first opening and closing cover 23 is open. Specifically, the gas springs 67 are configured to assist an opening operation of the first opening and closing cover 23. The gas springs 67 are configured to moderate a closing opening of the first opening and closing cover 23.

The printing device 10 includes slide support sections 68. The slide support sections 68 are connected to the housing frame 18 and the first opening and closing cover 23. The slide support sections 68 are provided along both end sections in the width direction X of the first opening and closing cover 23. The slide support sections 68 are configured to slidably support the first opening and closing cover 23 in accordance with the opening and closing operation of the first opening and closing cover 23.

As shown in FIG. 8, the slide support section 68 includes a support main body section 68A. The support main body section 68A has a flat plate shape extending in a longitudinal direction. The support main body section 68A is axially attached to the housing frame 18 so as to be rotatable about a shaft 68B along the width direction X. The shaft 68B is located at one end section of the support main body section 68A.

The support main body section 68A includes an elongated hole 68C. The elongated hole 68C is provided in the support main body section 68A along the longitudinal direction of the support main body section 68A. The elongated hole 68C is located at the other end section of the support main body section 68A. The elongated hole 68C is penetrated by a protruding section 23E. The protruding section 23E is formed of a pair of members and is provided so as to protrude in both the first width direction X1 and the second width direction X2 in the first opening and closing cover 23.

In a state where the first opening and closing cover 23 closes the first opening section 20, the slide support section 68 is arranged along the inner surface 23C of the first opening and closing cover 23. As a result, the slide support section 68 is located above the movement range 46 of the head 36 in the upward direction Z1, and can be arranged outside the movement range 46 of the head 36. The gas spring 67 is arranged along the inner surface 23C of the first opening and closing cover 23 in the same manner as the slide support section 68.

As shown in FIG. 9, the protruding section 23E of the first opening and closing cover 23 slides along the elongated hole 68C and by this the first opening section 20 enters an open state. Thus, the slide support section 68 guides the opening and closing operation of the first opening and closing cover 23. The first opening and closing cover 23 is supported by the slide support section 68 so as to be movable to a predetermined angle with respect to the top surface 16.

Figure 10:
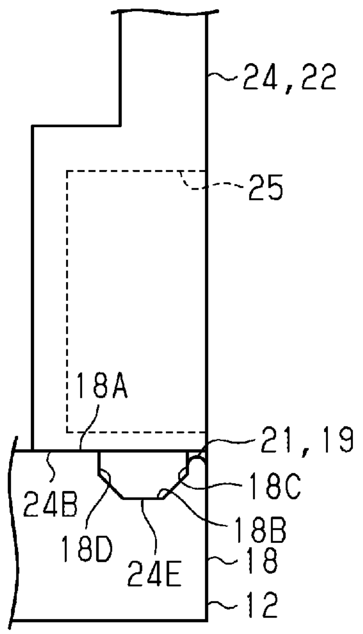
FIG. 10 is a cross-sectional view showing the opening and closing cover.

As shown in FIG. 10, the second opening and closing cover 24 includes an engagement section 24E. The engagement section 24E is provided at the other end section 24B of the second opening and closing cover 24. The engagement section 24E is configured to protrude toward the downward direction Z2 in a state where the second opening and closing cover 24 closes the second opening section 21. When the second opening and closing cover 24 is in a state of closing the second opening section 21, the engagement section 24E engages with the housing frame 18 at the front surface 12. That is, the engagement section 24E is engaged with the front surface 12 when the second opening and closing cover 24 is in a state of closing the second opening section 21.

The housing frame 18 includes an upper end section 18A. The upper end section 18A is an end section where the second opening section 21 is formed in the front surface 12. The housing frame 18 includes an engaged section 18B. The engaged section 18B is provided at the upper end section 18A of the housing frame 18. The engaged section 18B has a concave shape. The engaged section 18B is configured to extend in the width direction X.

The engaged section 18B includes a first abutment surface 18C and a second abutment surface 18D. The first abutment surface 18C is located in the forward direction Y1 from the engaged section 18B. The first abutment surface 18C is a surface facing the rearward direction Y2. The second abutment surface 18D is located in the rearward direction Y2 from the engaged section 18B. The second abutment surface 18D is a surface facing the forward direction Y1.

In a state where the engagement section 24E is engaged with the engaged section 18B, the engagement section 24E abuts the first abutment surface 18C in the forward direction Y1 and abuts the second abutment surface 18D in the rearward direction Y2. By this, the second opening and closing cover 24 does not move in the forward and rearward direction Y when a force is applied in the forward and rearward direction Y in accordance with an opening operation by a user.

Figure 11:
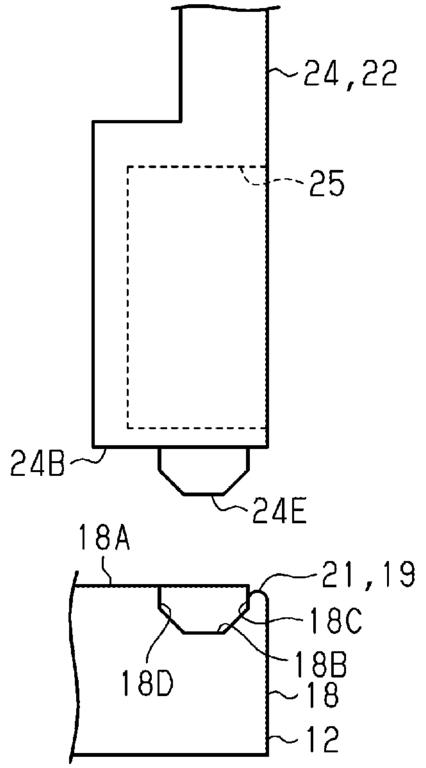
FIG. 11 is a cross-sectional view showing the opening and closing cover.

On the other hand, as shown in FIG. 11, the second opening and closing cover 24 moves in the upward direction Z1 when a force is applied in the upward direction Z1 in accordance with an opening operation by a user. By this, the engagement section 24E restricts movement of the second opening and closing cover 24 in the forward and rearward direction Y when the opening and closing cover 22 is in a state of closing the opening section 19. Since the engagement section 24E and the gripping section 25 are provided at the other end section 24B of the second opening and closing cover 24, it is possible to improve operability for the user in accordance with an opening and closing operation of the second opening and closing cover 24.

Detailed Configuration of Medium Support Section 28

Next, the detailed configuration of the medium support section 28 will be described.

Figure 12:
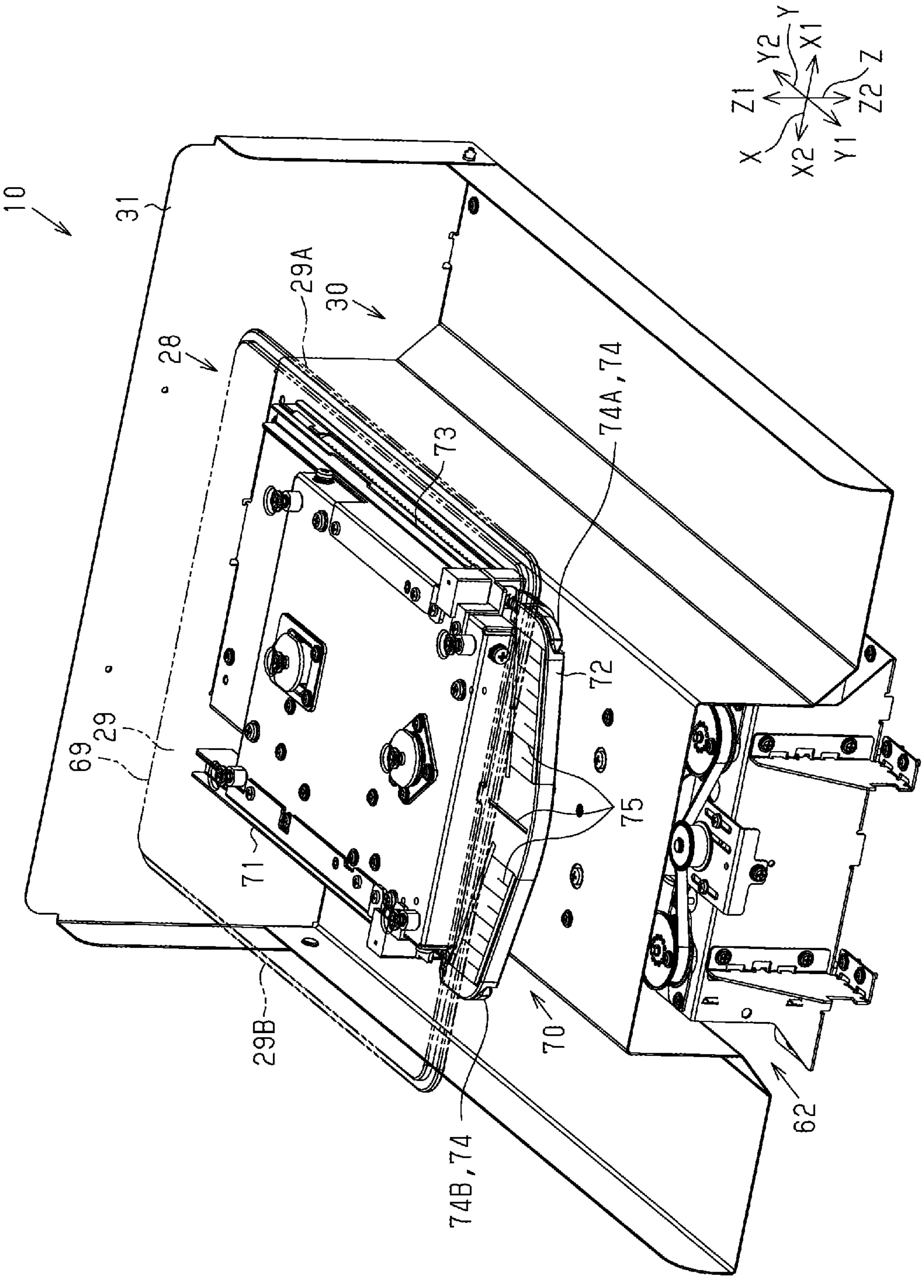
FIG. 12 is a perspective view showing a medium support section.

As shown in FIG. 12, the medium support section 28 includes a tray 69 and a tray support section 70. The tray 69 may be made of a translucent member. The tray 69 may be indicated in the drawings by two dot chain line. The tray 69 includes a support surface 29. In other words, the tray 69 is configured to support the medium. The tray 69 may have a rectangular shape. A longitudinal direction of the tray 69 may be the forward and rearward direction Y.

The tray support section 70 is configured to support the tray 69 from the downward direction Z2 side. The tray support section 70 includes a main body section 71. The main body section 71 is configured to support the tray 69.

The tray support section 70 includes a positioning section 72. The positioning section 72 is located at the forward direction Y1 side of the tray 69. The positioning section 72 is configured to determine a placement position of the medium with respect to the tray 69. In particular, the positioning section 72 is configured to determine a placement position of the medium with respect to the tray 69 in the forward and rearward direction Y. The positioning section 72 has a line-symmetric shape with respect to a predetermined direction parallel to the support surface 29. The predetermined direction parallel to the support surface 29 in the present embodiment is the forward and rearward direction Y.

Figure 13:
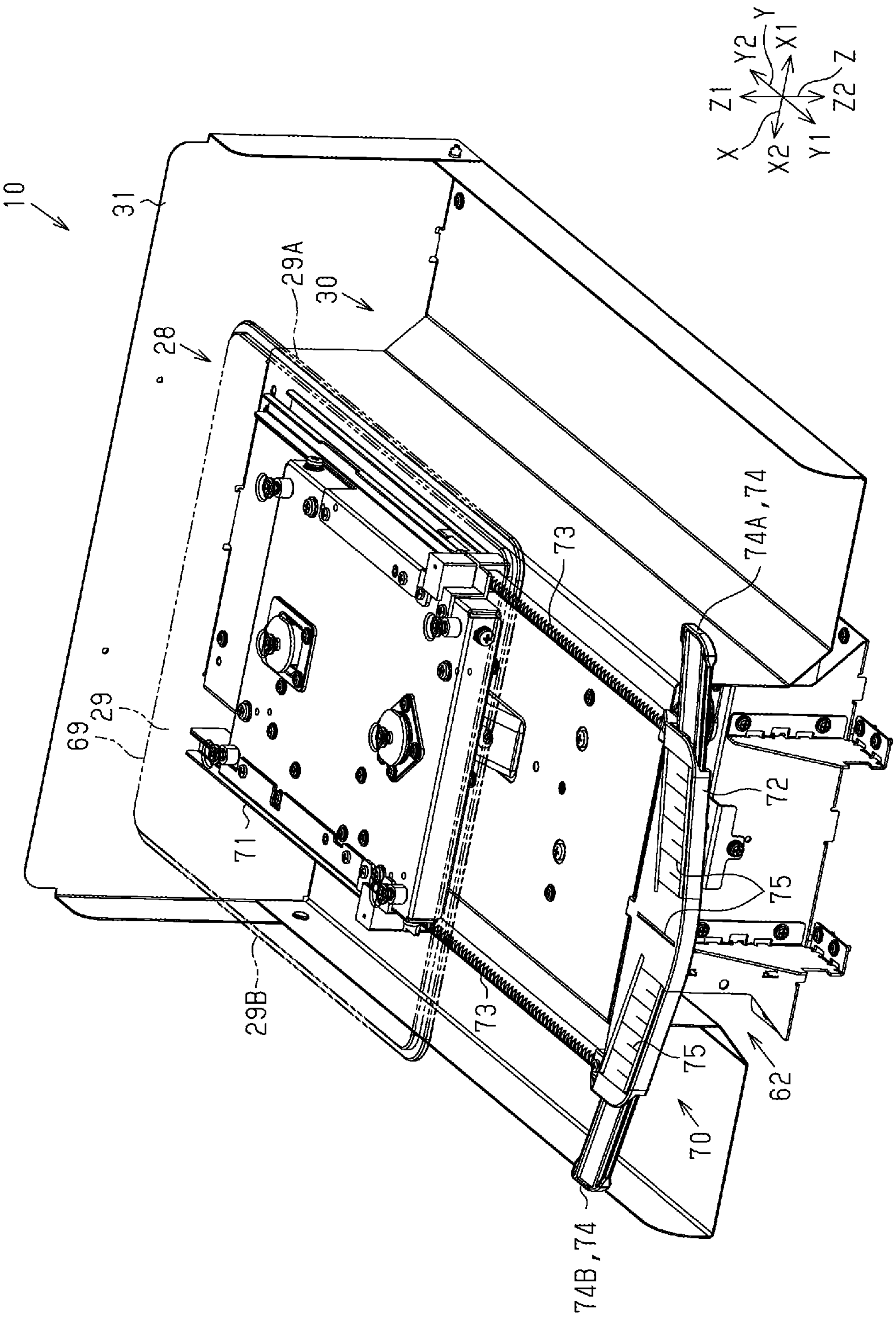
FIG. 13 is a perspective view showing the medium support section.

As shown in FIG. 13, the positioning section 72 includes a position changing section 73. In particular, the positioning section 72 may include a pair of position changing sections 73. The position changing section 73 can expand and contract in the forward and rearward direction Y with respect to the main body section 71. One of the pair of position changing sections 73 is provided along the first side end section 29A. The other of the pair of position changing sections 73 is provided along the second side end section 29B.

The position changing section 73 can change a position of the positioning section 72 with respect to the main body section 71. The position changing section 73 can change a placement position of the medium with respect to the tray 69. In particular, the position changing section 73 can change a placement position of the medium with respect to the tray 69 in the forward and rearward direction Y.

The positioning section 72 includes an expanding and contracting section 74. The expanding and contracting section 74 can expand and contract according to a shape of the medium. The expanding and contracting section 74 can expand and contract in an expansion and contraction direction parallel to the support surface 29. The expansion and contraction direction parallel to the support surface 29 in the present embodiment is a direction including a component of the width direction X, and the expanding and contracting section 74 can expand and contract in the direction including a component of the width direction X.

The expanding and contracting section 74 includes a first expanding and contracting section 74A and a second expanding and contracting section 74B. The first expanding and contracting section 74A is configured to protrude from the first side end section 29A in the first width direction X1. The second expanding and contracting section 74B is configured to protrude from the second side end section 29B in the second width direction X2.

The positioning section 72 includes a positioning reference section 75. The positioning reference section 75 is arranged at a position at a center with respect to the forward and rearward direction Y. As a result, when the medium is placed on the support surface 29, a reference position as a center of the medium indicated by the positioning reference section 75 can be visually checked.

The positioning reference section 75 is arranged at a position line-symmetric with respect to the forward and rearward direction Y. Thus, when the medium is placed on the support surface 29, a reference position of the medium in the width direction X indicated by the positioning reference section 75 can be visually checked.

Here, the tray support section 70 will be described.

Figure 14:
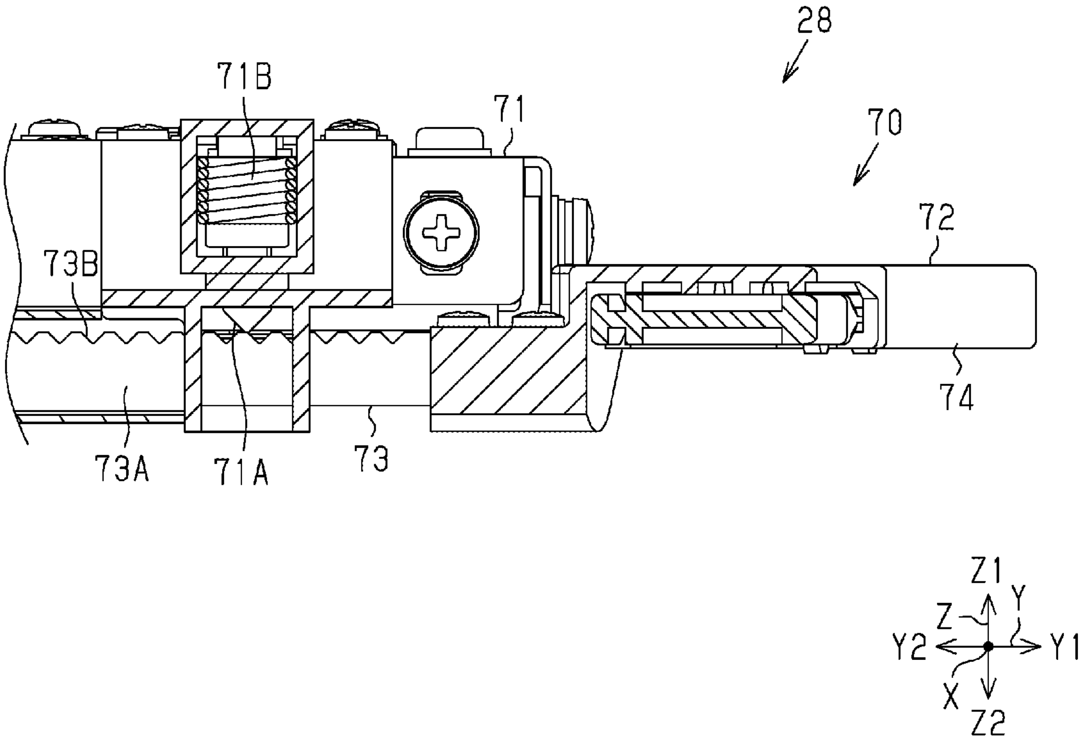
FIG. 14 is a cross-sectional view showing a tray support section.

As shown in FIG. 14, in the tray support section 70, the main body section 71 includes a main body engagement section 71A and a biasing member 71B. The main body engagement section 71A is movable along the vertical direction Z. The biasing member 71B biases the main body engagement section 71A toward the downward direction Z2. The biasing member 71B may be a coil spring.

The position changing section 73 includes a slide guide section 73A and a position changing engagement section 73B. The slide guide section 73A is configured to extend in the forward and rearward direction Y. The slide guide section 73A is connected to the positioning section 72 in the forward direction Y1. The slide guide section 73A is engageable with the main body section 71 in the rearward direction Y2. Thus, the slide guide section 73A can change a position of the positioning section 72 with respect to the main body section 71.

The position changing engagement section 73B is located in the upward direction Z1 from the slide guide section 73A. The position changing engagement section 73B is located in the downward direction Z2 from the main body engagement section 71A. The position changing engagement section 73B is configured to be engageable with the main body engagement section 71A. The position changing engagement section 73B may be a plurality of groove sections provided at predetermined intervals in the forward and rearward direction Y. In this manner, the position changing engagement section 73B is configured to engage with the main body section 71 at predetermined intervals. The position changing section 73 can change the positions of the main body section 71 and the positioning section 72 at predetermined intervals by the position changing engagement section 73B.

Position Adjustment Section 62

As shown in FIGS. 12 and 13, the tray support section 70 includes the position adjustment section 62. In other words, the medium support section 28 includes the position adjustment section 62. The position adjustment section 62 is configured to adjust a position of the main body section 71 in the vertical direction Z. In other words, the position adjustment section 62 is configured to adjust a position of the tray 69 in the vertical direction Z. Thus, the position adjustment section 62 is configured to adjust a position of the support surface 29 in the vertical direction Z. The position adjustment section 62 may be configured to adjust a position of the accommodation tray 31 in the vertical direction Z in conjunction with an adjustment of a position of the support surface 29.

In particular, as shown in FIG. 5, the position adjustment section 62 can adjust the support surface 29 to a printing position in the vertical direction Z. The printing position is a position where the support surface 29 is arranged when printing is performed. The printing position is a position where the support surface 29 is arranged outside the movement range 46 of the head 36. The printing position is a position where the support surface 29 is arranged in the downward direction Z2 of the movement range 46 of the head 36. The printing position is also a position where the accommodation tray 31 does not cover the first guide section 42 from the forward direction Y1 side.

Figure 15:
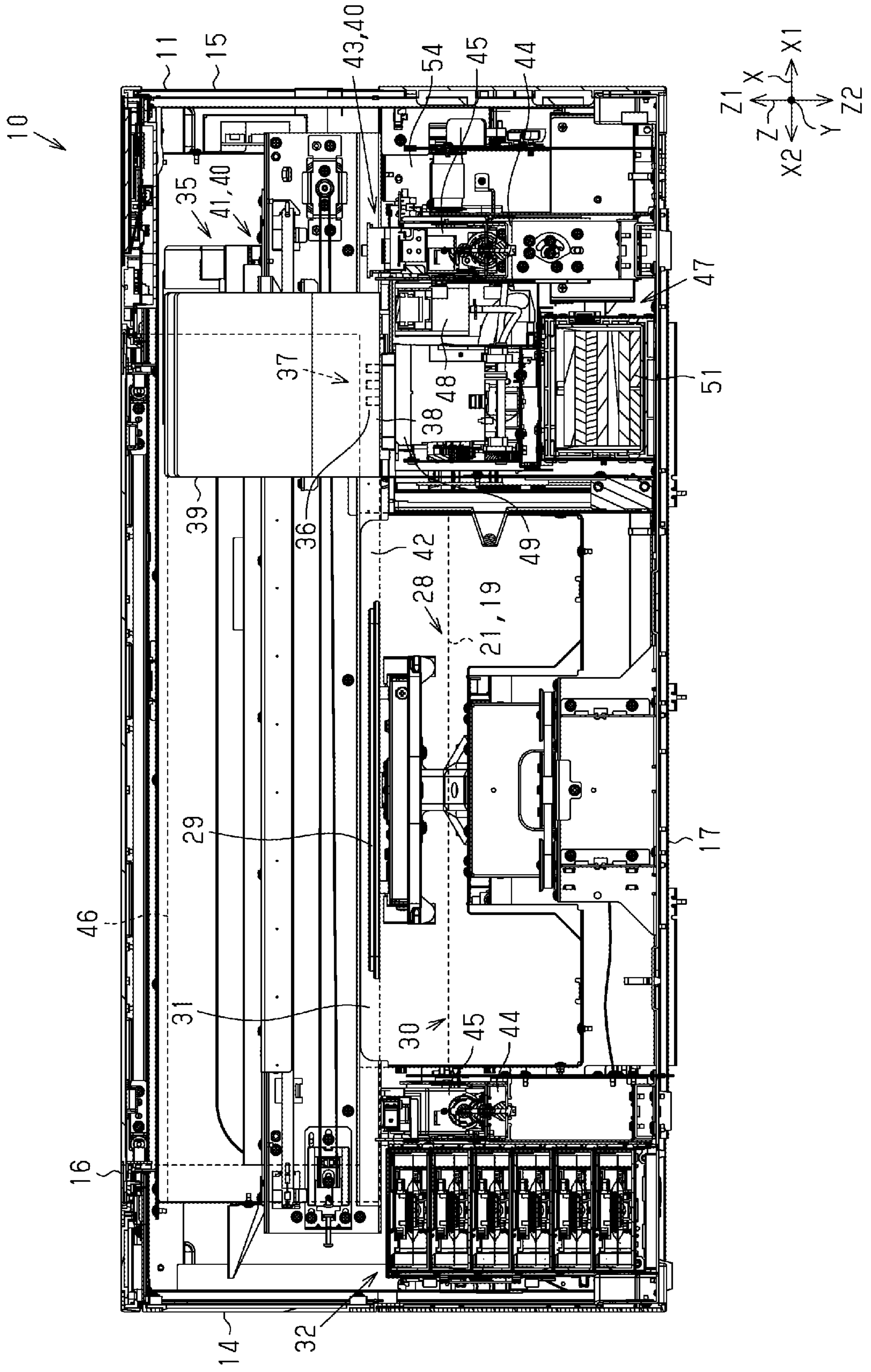
FIG. 15 is a front view showing the printing device.

On the other hand, as shown in FIG. 15, the position adjustment section 62 can adjust the support surface 29 to the placement position in the vertical direction Z. The placement position is a position where the support surface 29 is arranged when the medium can be placed on the support surface 29. The placement position is a position where the support surface 29 is arranged within the movement range 46 of the head 36. The placement position is a position where the support surface 29 is arranged when printing is not performed. The placement position is also a position where the accommodation tray 31 covers the first guide section 42 from the forward direction Y1 side. As a result, when a user places the medium on the support surface 29, it is possible to prevent the user from touching the first guide section 42. Grease may be deposited to the first guide section 42 in order to move the carriage 39 along the width direction X. Thus, when a user places the medium on the support surface 29, it is possible to suppress grease from being deposited to a hand of the user by the user touching the first guide section 42, and to suppress the medium from being contaminated.

Print Control Process

Here, a print control process will be described with reference to FIG. 16. The print control process is a process executed by the control section 53 at predetermined intervals. Here, an order of each process can be arbitrarily changed within a range not deviating from a purpose of each process.

Figure 16:
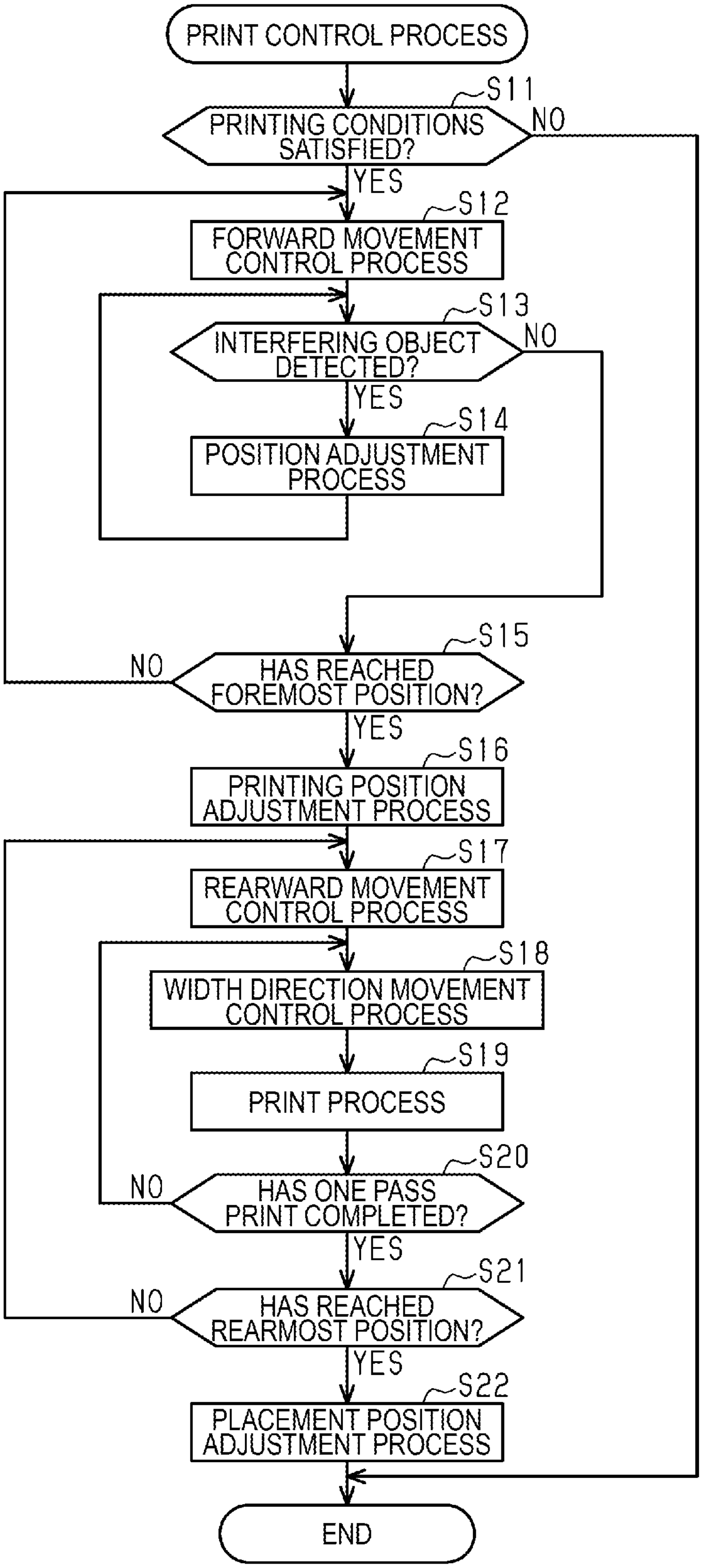
FIG. 16 is a flowchart showing a print control process.

As shown in FIG. 16, in step S11, the control section 53 determines whether or not printing conditions are satisfied. In this process, while printing is not being performed, the control section 53 determines that printing conditions are satisfied by receiving a printing instruction from a user. When the control section 53 determines that printing conditions are not satisfied, the control section 53 ends the print control process. On the other hand, when the control section 53 determines that printing conditions are satisfied, the control section 53 shifts the process to step S12.

In step S12, the control section 53 executes a forward movement control process. In this process, the control section 53 controls the second drive section 56 so that the second head movement section 43 moves the head 36 in the forward direction Y1 by a predetermined distance. When this process is completed, the control section 53 shifts the process to step S13.

In step S13, the control section 53 determines, based on a detection signal from the interference detection section 61, whether or not an object interfering with the head 36 was detected. In a case where the control section 53 determines that an interfering object was not detected, the control section 53 shifts the process to step S15 without executing step S14. On the other hand, when the control section 53 determines that an interfering object was detected, the control section 53 shifts the process to step S14.

In step S14, the control section 53 executes a position adjustment process. In this process, the control section 53 controls the position adjustment section 62 so as to move the support surface 29 in the downward direction Z2 by a predetermined distance. When this process is completed, the control section 53 shifts the process to step S13 again. As a result, the control section 53 controls the position adjustment section 62 so as to move the support surface 29 in the downward direction Z2 to a position where no interfering object is detected.

In step S15, the control section 53 determines whether or not the head 36 has reached the foremost position based on a detection signal from the forward position detection section 59. When the control section 53 determines that the head 36 has not reached the foremost position, the control section 53 shifts the process to step S12 again. As a result, the control section 53 controls the position adjustment section 62 so as to move the head 36 in the forward direction Y1 until the head 36 reaches the foremost position, and so as to move the support surface 29 in the downward direction Z2 to a position at which an interfering object is not detected. On the other hand, when the control section 53 determines that the head 36 has reached the foremost position, the control section 53 shifts the process to step S16.

In step S16, the control section 53 executes a printing position adjustment process. In this process, the control section 53 controls the position adjustment section 62 so as to move the support surface 29 in the downward direction Z2 by a specified distance. As a result, the control section 53 controls the position adjustment section 62 so as to move the support surface 29 in the downward direction Z2 by the specified distance from a position where no interfering object was detected. When this process is completed, the control section 53 shifts the process to step S17.

In step S17, the control section 53 executes a rearward movement control process. In this process, the control section 53 controls the second drive section 56 so as to move the head 36 in the rearward direction Y2 by a predetermined distance. When this process is completed, the control section 53 shifts the process to step S18.

In step S18, the control section 53 executes a width direction movement control process. In this process, the control section 53 controls the first drive section 55 so that the first head movement section 41 moves the head 36 in the width direction X by a predetermined distance. When this process is completed, the control section 53 shifts the process to step S19.

In step S19, the control section 53 executes a print process. In this process, the control section 53 controls the head 36 so as to perform printing on the medium based on image data included in the printing instruction. When this process is completed, the control section 53 shifts the process to step S20.

In step S20, the control section 53 determines whether printing of one pass has been completed based on a detection signal from the movement position detection section 58. When the control section 53 determines that printing of one pass has not been completed, the control section 53 shifts the process to step S18 again. Thus, the control section 53 performs printing for one pass. On the other hand, when the control section 53 determines that the printing for one pass has been completed, the control section 53 shifts the process to step S21.

In step S21, the control section 53 determines whether the head 36 has reached the rearmost position based on a detection signal from the rearward position detection section 60. When the control section 53 determines that the head 36 has not reached the rearmost position, the control section 53 shifts the process to step S17 again. Thus, the control section 53 controls the head 36 so as to perform printing on the medium by moving the head 36 in the rearward direction Y2 and the width direction X until the head 36 reaches the rearmost position. On the other hand, when the control section 53 determines that the head 36 has reached the rearmost position, the control section 53 shifts the process to step S22.

In step S22, the control section 53 executes a placement position adjustment process. In this process, the control section 53 controls the position adjustment section 62 so as to move the support surface 29 to the placement position by moving the support surface 29 in the upward direction Z1. When this process is completed, the control section 53 ends the print control process.

In this way, when drive conditions are satisfied, the control section 53 drives the position adjustment section 62 so that the support surface 29 is set to the placement position. The drive conditions are satisfied when printing is not being performed and the head 36 is arranged at the retreat position. Thus, while printing is not being performed and the head 36 is arranged at the retreat position, the position adjustment section 62 can move the support surface 29 to a position higher than the nozzle surface 38 in the vertical direction Z. In other words, while printing is not being performed and the head 36 is arranged at the retreat position, the position adjustment section 62 can move the support surface 29 from outside the movement range to inside the movement range.

Operations of First Embodiment

The operation of the first embodiment will be described.

As shown in FIG. 15, when a power supply is turned on in the printing device 10, the support surface 29 is arranged at the placement position in a state where the head 36 is arranged at the standby position. As a result, the support surface 29 rises so as to be arranged within the movement range 46 of the head 36.

As shown in FIGS. 7 to 9, when the opening and closing cover 22 is opened by a user, the opening section 19 is opened. In particular, in a state where the engagement section 24E is engaged with the engaged section 18B, the opening and closing cover 22 is opened by a user so that the second opening and closing cover 24 moves in the upward direction Z1. In particular, the first opening and closing cover 23 is opened so that the protruding section 23E slides along the elongated hole 68C. In accordance with such an opening operation, the slide support section 68 supports the opening and closing cover 22 and receives an assist from the gas spring 67. The opening and closing cover 22 is movable to a predetermined angle in a state in which the inner surface 23C of the first opening and closing cover 23 and the inner surface 24C of the second opening and closing cover 24 are folded so as to face each other.

On the other hand, when the opening and closing cover 22 is closed by a user, the opening section 19 is closed while the engagement section 24E is engaged with the engaged section 18B. In particular, the first opening and closing cover 23 closes the first opening section 20 with the protruding section 23E sliding along the elongated hole 68C. In accordance with such an closing operation, the gas spring 67 can prevent the opening and closing cover 22 from suddenly falling.

Figure 17:
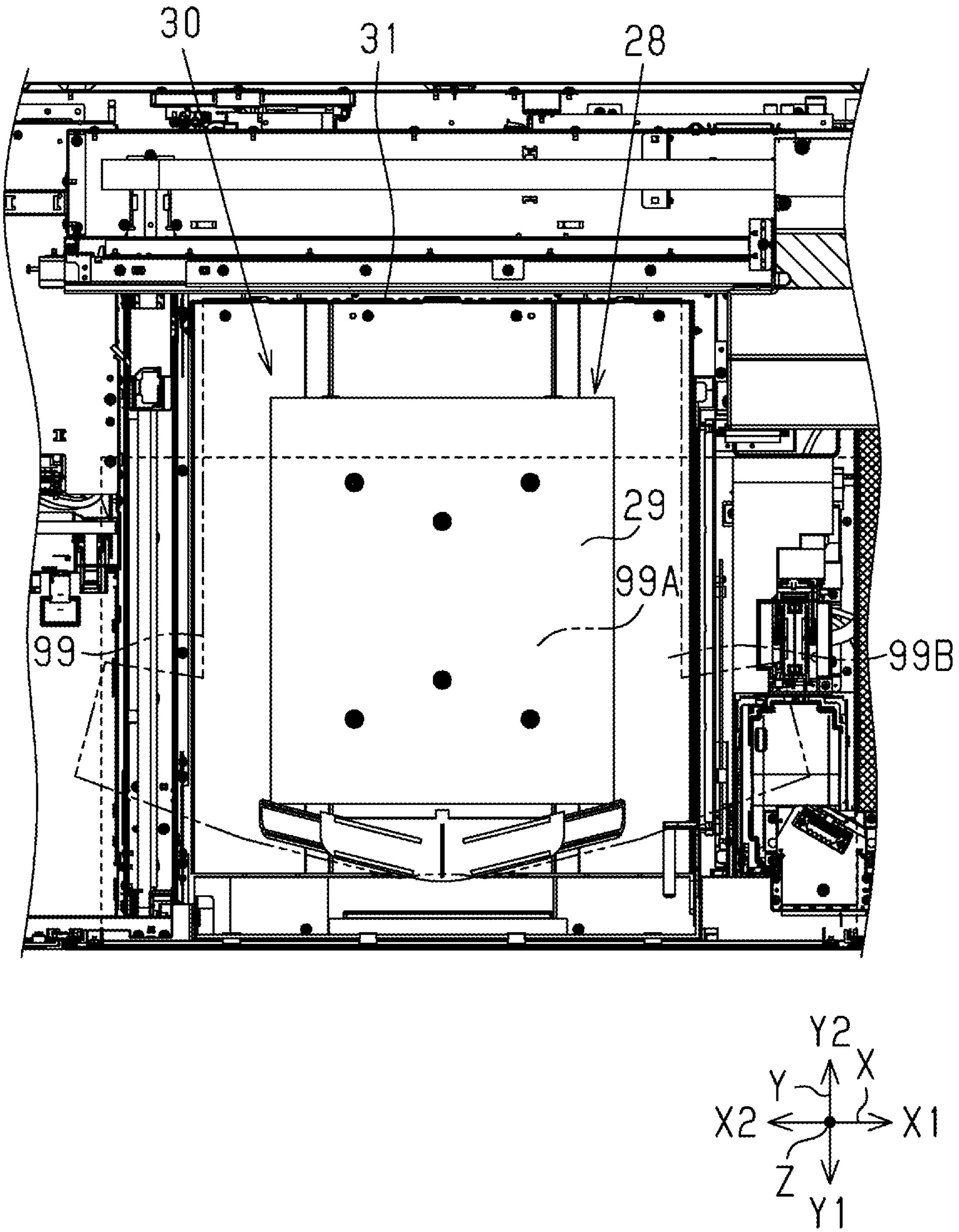
FIG. 17 is a top view showing the printing device.

As shown in FIG. 17, a user can easily place a T-shirt 99 on the support surface 29 from the forward direction Y1 side in a state in which the opening section 19 is opened and the support surface 29 is arranged at the placement position. Specifically, a body of the T-shirt 99 is passed from the forward direction Y1 side of the tray 69, so that an inner surface of the body of the T-shirt 99 is placed on the support surface 29. In this case, at least a printed region 99A of the T-shirt 99 is supported by the support surface 29.

When the T-shirt 99 is placed on the support surface 29, a positioning of the T-shirt 99 with respect to the support surface 29 is performed by the positioning section 72. In particular, a user can place the T-shirt 99 on the support surface 29 while visually checking a center position of the T-shirt 99 in the width direction X and a line-symmetrical position from the center position of the T-shirt 99 with reference to the positioning reference section 75. An example of the center position of the T-shirt 99 in the width direction X is a tag of the T-shirt 99. An example of the position line-symmetrically from the center position of the T-shirt 99 is a position around a neck of the T-shirt 99.

Further, the T-shirt 99 can be placed at an appropriate position on the support surface 29 by adjusting the position changing section 73 and the expanding and contracting section 74 according to a size of the T-shirt 99. In particular, by adjusting the position changing section 73, the T-shirt 99 can be placed at an appropriate position on the support surface 29 in the forward and rearward direction Y. By adjusting the expanding and contracting section 74, the T-shirt 99 can be placed at an appropriate position on the support surface 29 at a position line-symmetrically from the center position of the T-shirt 99.

Figure 18:
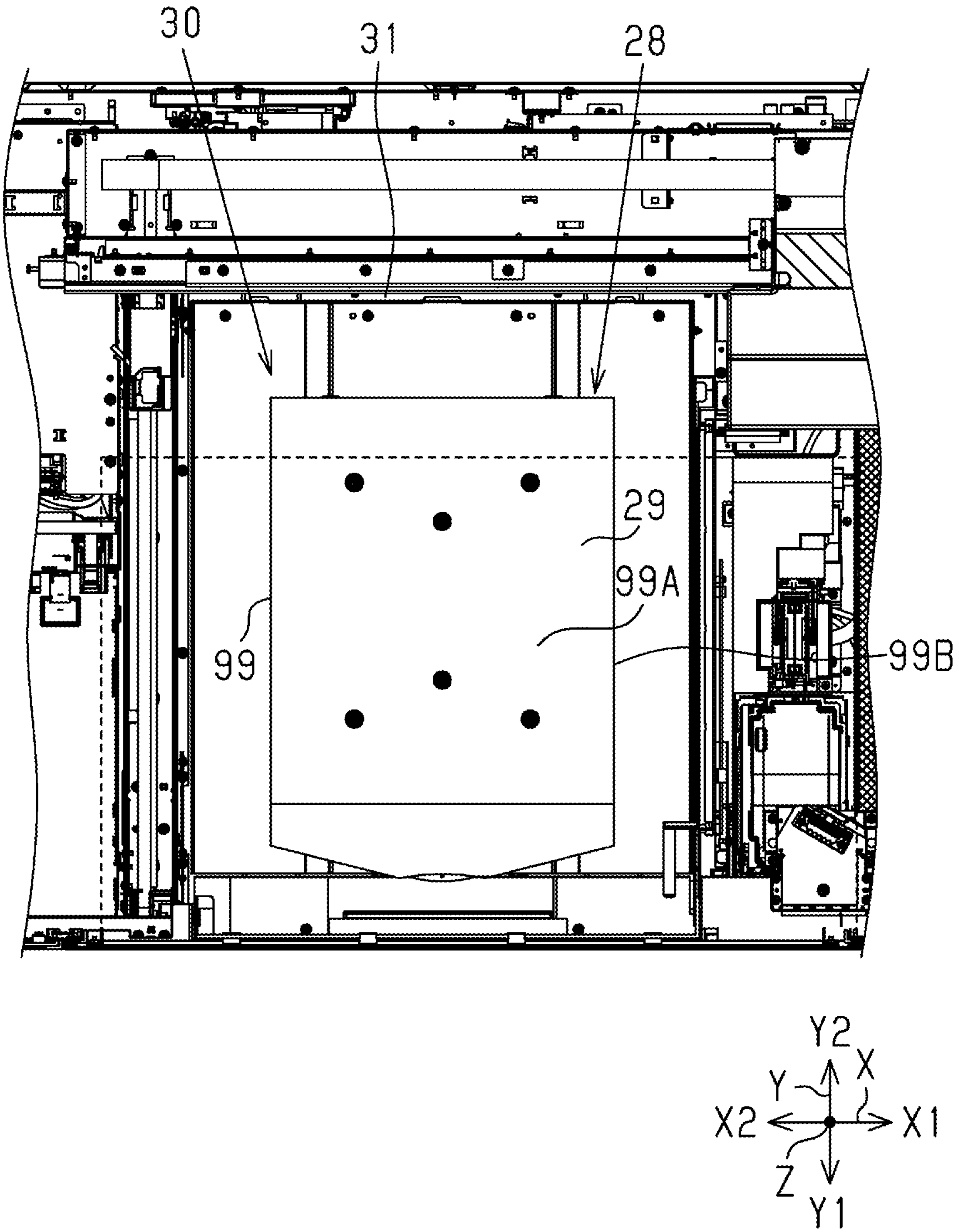
FIG. 18 is a top view showing the printing device.
Figure 19:
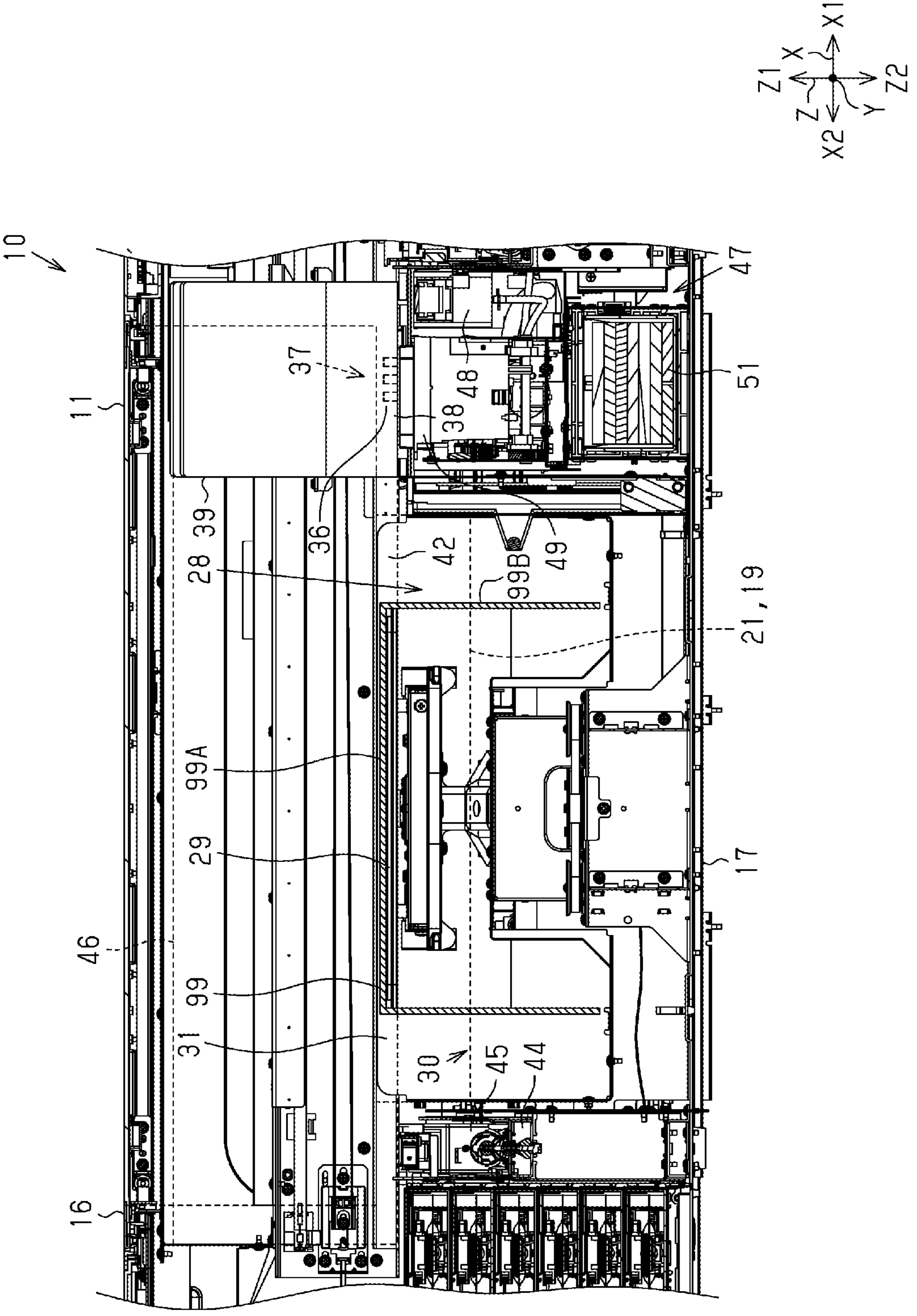
FIG. 19 is a front view showing the printing device.

As shown in FIGS. 18 and 19, a non-placement region 99B of the T-shirt 99 is accommodated in the medium accommodation section 30. The non-placement region 99B is a partial region of the T-shirt 99 that is not supported by the support surface 29. Specifically, the non-placement region 99B is accommodated in the medium accommodation section 30 in the first width direction X1, the second width direction X2, and the rearward direction Y2 of the support surface 29.

As shown in FIG. 5, when a printing instruction is input in a state in which the opening section 19 is closed, in the position adjustment section 62, the support surface 29 moves in the downward direction Z2 to a position at which an interfering object was not detected in accordance with a movement of the head 36 in the forward direction Y1. As a result, the support surface 29 is arranged at the printing position.

Printing is performed as the head 36 moves in the rearward direction Y2. Thus, the printing section 35 can perform printing on the medium placed on the support surface 29 without the head 36 colliding with the support surface 29.

As shown in FIG. 15, when the printing is completed, in a state in which the head 36 is arranged at the standby position, the support surface 29 of the position adjustment section 62 moves from the printing position to the placement position. Thus, the position adjustment section 62 can adjust a position of the support surface 29 in the upward direction Z1 while printing is not being performed, as compared with the case where printing is being performed. The accommodation tray 31 moves in the upward direction Z1 in conjunction with the support surface 29, and the accommodation tray 31 covers the first guide section 42 from the forward direction Y1 side. Thus, it is possible to prevent a user from touching the first guide section 42.

Effects of First Embodiment

Effects of the first embodiment will be described.

(1) The medium support section 28 includes the support surface 29 that supports at least the printed region 99A of the medium. The medium accommodation section 30 can accommodate the non-placement region 99B, which is not supported by the support surface 29. The medium support section 28 is configured so as not to move in a direction parallel to the support surface 29. The head movement section 40 moves the head 36 in a direction parallel to the support surface 29. In the related art, it is necessary to move the tray to outside the housing in order to support the medium, and a mechanism for stably moving the tray to outside the housing is required, which causes an increase in a size of the printing device. By adopting the above-described configuration, it is not necessary to provide a configuration for moving the support surface 29 in a direction parallel to the support surface 29. Therefore, it is possible to reduce the size of the printing device 10. In particular, even in a case where it is assumed that the medium accommodation section 30 is provided, it is possible to reduce the size of the printing device 10.

(2) The medium support section 28 includes a position adjustment section 62 that adjusts a position of the support surface 29 in the vertical direction Z. Therefore, by appropriately adjusting positions of the medium supported by the support surface 29 and the head 36, printing quality can be improved.

(3) The first head movement section 41 moves the head 36 in the width direction X, and the second head movement section 43 moves the head 36 in the forward and rearward direction Y. Therefore, the head 36 can be moved in the width direction X and the forward and rearward direction Y, and it is not necessary to provide a structure for moving the support surface 29 in a direction parallel to the support surface 29. Therefore, it is possible to reduce the size of the printing device 10.

(4) The head movement section 40 is accommodated in the housing 11. Therefore, the head 36 can be moved in the horizontal direction while the head movement section 40 is accommodated in the housing 11, and the relative positional relationship between the head 36 and the support surface 29 can be changed in the horizontal direction. Thus, it is not necessary to provide a structure for moving the support surface 29 in a direction parallel to the support surface 29. Therefore, it is possible to reduce the size of the printing device 10.

(5) As viewed from the vertical direction Z, the opening section 19 has a shape longer than the support surface 29 in the width direction X. Therefore, when the medium is placed on the support surface 29, handling of the medium in the width direction X becomes easy, and an operability for the user can be improved.

(6) The flushing section 48 is arranged at a position that does not overlap the medium support section 28 in the vertical direction Z. The waste liquid tank 51 is arranged at a position that overlaps the flushing section 48 in the vertical direction Z. Therefore, it is possible to collectively arrange the flushing section 48 and the waste liquid tank 51 at positions overlapping in the vertical direction Z while achieving a reduction in size in the vertical direction Z at the position where the medium support section 28 is provided. Therefore, it is possible to reduce the size of the printing device 10 while efficiently arranging the flushing section 48 and the waste liquid tank 51.

(7) The wiping section 49 is arranged at a position that does not overlap the medium support section 28 in the vertical direction Z. The waste liquid tank 51 is arranged at a position that overlaps the wiping section 49 in the vertical direction Z. Therefore, it is possible to collectively arrange the wiping section 49 and the waste liquid tank 51 at positions overlapping in the vertical direction Z while achieving a reduction in size in the vertical direction Z at the position where the medium support section 28 is provided. Therefore, it is possible to reduce the size of the printing device 10 while efficiently arranging the wiping section 49 and the waste liquid tank 51.

(8) The housing 11 accommodates the medium support section 28 and the printing section 35. In other words, while printing is not being performed and the head 36 is arranged at the retreat position where the nozzle surface 38 does not face the support surface 29, the position adjustment section 62 can move the support surface 29 from outside the movement range 46 of the head 36 to inside the movement range 46 of the head 36. In the related art, the tray has to be moved outside the housing in order to have placed thereon the medium. Therefore, it is necessary to secure a space for supporting the medium outside the housing. Thus, it is necessary to secure a sufficient installation space for installing the printing device. According to the above-described configuration, since the medium support section 28 and the printing section 35 are accommodated in the housing 11, it is not necessary to secure a space for supporting the medium outside the housing 11. Therefore, the installation space of the printing device 10 can be reduced.

(9) In addition, when printing is not performed and the head 36 is arranged at the retreat position, the support surface 29 can be moved from outside the movement range 46 of the head 36 to inside the movement range 46 of the head 36. Therefore, when the medium is placed on the support surface 29, handling of the medium becomes easy, and operability for the user can be improved. The installation space of the printing device 10 can be reduced.

(10) The housing 11 includes an opening section 19 that exposes the support surface 29. Therefore, the medium can be placed on the support surface 29 accommodated in the housing 11 from outside the housing 11 via the opening section 19, and operability for the user can be improved.

(11) The housing 11 includes an opening and closing cover 22 capable of opening and closing the opening section 19. Therefore, since the opening section 19 is opened by the opening and closing cover 22, the medium can be placed on the support surface 29 accommodated in the housing 11 from outside the housing 11 via the opening section 19, and operability for the user can be improved. On the other hand, since the opening section 19 is closed by the opening and closing cover 22, it is possible to prevent foreign matter from entering inside the housing 11 from outside the housing 11 via the opening section 19.

(12) The movement range 46 of the head 36 includes a position where the nozzle surface 38 faces the maintenance section 47. Therefore, maintenance of the nozzle surface 38 can be performed by moving the nozzle surface 38 to a position facing the maintenance section 47, and it is possible to suppress a decrease in printing quality.

(13) The maintenance section 47 includes a flushing section 48 that receives liquid ejected from the head 36. Therefore, by moving the nozzle surface 38 to a position facing the flushing section 48, it is possible to receive liquid ejected from the head 36, and it is possible to suppress a decrease in printing quality.

(14) The maintenance section 47 includes a wiping section 49 capable of wiping the nozzle surface 38. Therefore, by moving the nozzle surface 38 to a position facing the wiping section 49, it is possible to wipe the nozzle surface 38, and it is possible to suppress a decrease in printing quality.

(15) While printing is not being performed, the position adjustment section 62 can move the support surface 29 to a position higher than the nozzle surface 38 in the vertical direction Z when the head 36 is arranged at the retreat position. Therefore, when printing is not performed and the head 36 is arranged at the retreat position, the support surface 29 can be moved to a position higher than the nozzle surface 38. Therefore, when the medium is placed on the support surface 29, a user can work at a position closer to the first opening section 20 in the housing 11, so that handling of the medium becomes easy and operability for the user can be improved.

(16) The first opening and closing cover 23 is connected to the top surface 16 by the first connection section 65, and the second opening and closing cover 24 is connected to the first opening and closing cover 23 by the second connection section 66. The first opening and closing cover 23 is movable to a predetermined angle with respect to the top surface 16. The first opening and closing cover 23 and the second opening and closing cover 24 can be folded such that the inner surface 23C of the first opening and closing cover 23 and the inner surface 24C of the second opening and closing cover 24 face each other when the first opening section 20 and the second opening section 21 are opened. In the related art, opening an opening and closing cover required a sufficient space around a printing device. By adopting the above-described configuration, the first opening section 20 and the second opening section 21 can be opened in a state where the first opening and closing cover 23 and the second opening and closing cover 24 are folded so that the inner surface 23C of the first opening and closing cover 23 and the inner surface 24C of the second opening and closing cover 24 face each other. Thus, the opening and closing operation can be performed with the first opening and closing cover 23 and the second opening and closing cover 24 connected to each other. In a case where the first opening and closing cover 23 and the second opening and closing cover 24 open the first opening section 20 and the second opening section 21, it is possible to reduce a space required around the printing device 10. In particular, the first opening and closing cover 23 and the second opening and closing cover 24 can be folded so that the inner surface 23C of the first opening and closing cover 23 and the inner surface 24C of the second opening and closing cover 24 face each other, and it is possible to possible to reduce the possibility of giving a user positioned on the forward direction Y1 side an oppressive feeling. Therefore, the installation space of the printing device 10 can be reduced and operability for the user can be improved.

(17) The printing device 10 includes an opening and closing detection section 63 that detects the opening and closing state of the first opening and closing cover 23. Therefore, it is possible to perform an operation in accordance with the opening and closing state of the first opening and closing cover 23. Therefore, operability for the user can be improved.

(18) The second opening and closing cover 24 includes the engagement section 24E that engages with the front surface 12 when the second opening and closing cover 24 is in the state of closing the second opening section 21. Therefore, the second opening and closing cover 24 can stably close the second opening section 21. Therefore, operability for the user can be improved.

(19) The engagement section 24E restricts movement of the second opening and closing cover 24 in the forward and rearward direction Y when the second opening and closing cover 24 is in the state of closing the second opening section 21. Therefore, the opening operation of the second opening and closing cover 24 can be performed smoothly. Therefore, operability for the user can be improved.

(20) The engagement section 24E is provided at the other end section 24B of the second opening and closing cover 24. Therefore, the second opening and closing cover 24 can more stably close the second opening section 21. Therefore, operability for the user can be improved. In order to open the opening and closing cover 22 in a state where the engagement section 24E is engaged, the second opening and closing cover 24 has to be moved in the upward direction Z1. As the second opening and closing cover 24 is moved in the upward direction Z1, the first opening and closing cover 23 is also moved, and the opening and closing detection section 63 detects that the first opening and closing cover 23 is open.

(21) The gripping section 25 is provided at the other end section 24B of the second opening and closing cover 24. Therefore, it is possible to provide a situation in which a user can easily grip the second opening and closing cover 24 in accordance with the opening and closing operation of the second opening and closing cover 24 Therefore, operability for the user can be improved. In particular, by folding the first opening and closing cover 23 and the second opening and closing cover 24 so that the inner surface 23C of the first opening and closing cover 23 and the inner surface 24C of the second opening and closing cover 24 face each other, and the gripping section 25 is arranged at a low position in the vertical direction Z. Therefore, operability for the user can be improved even if the height of the user is short.

(22) The printing device 10 includes the slide support section 68 that slidably supports the first opening and closing cover 23 in accordance with the opening and closing operation of the first opening and closing cover 23. Therefore, the opening and closing operation of the first opening and closing cover 23 can be performed smoothly. Therefore, operability for the user can be improved.

(23) The printing device 10 includes gas springs 67 that adjust the opening and closing operation of the first opening and closing cover 23. Therefore, it is possible to adjust the opening and closing operation of the first opening and closing cover 23. Therefore, operability for the user can be improved.

(24) The first opening section 20 is opened between the front surface 12 and the first position 20A in the forward and rearward direction Y. The first position 20A is closer to the rear surface 13 than to the front surface 12. The first axis 23D is provided at the first position 20A. The first opening section 20 is opened between the front surface 12 and the first axis 23D in the forward and rearward direction Y. Therefore, even when the first opening section 20 that is opened to a large amount in the forward and rearward direction Y is provided, the installation space of the printing device 10 can be reduced, and operability for the user can be improved.

(25) The first opening section 20 has a shape longer than the support surface 29 in the width direction X when viewed from the vertical direction Z. Therefore, even when the first opening section 20 that is opened to a large amount in the forward and rearward direction Y is provided, the installation space of the printing device 10 can be reduced, and operability for the user can be improved.

(26) The tray support section 70 supports a tray 69 including a support surface 29 on which a medium can be placed, and includes a positioning section 72 that determines the placement position of the medium with respect to the tray 69. In the related art, in order to move a tray in a horizontal direction, a tray itself on which a medium is placed is provided with a positioning section. Therefore, the tray becomes heavy, and it is desirable to reduce weight of the tray in order to stably support the tray. By adopting the above-described configuration, the positioning section 72 that determines the placement position of the medium with respect to the tray 69 is provided not on the tray 69 itself, but on the tray support section 70 that supports the tray 69. Therefore, the weight of the tray 69 can be reduced.

(27) The positioning section 72 has a position changing section 73 capable of changing the placement position of the medium with respect to the tray 69. Therefore, the position changing section 73 is provided on the positioning section 72. Therefore, the placement position of the medium with respect to the tray 69 can be changed, and the weight of the tray 69 can be reduced.

(28) The position changing section 73 can change the placement position of the medium with respect to the tray 69 in the forward and rearward direction Y. Therefore, the placement position of the medium can be adjusted in the forward and rearward direction Y. Therefore, the placement position of the medium with respect to the tray 69 can be changed, and the weight of the tray 69 can be reduced.

(29) The tray support section 70 includes a main body section 71. The position changing section 73 includes a position changing engagement section 73B that engages with the main body section 71 at predetermined intervals. Therefore, the placement position of the medium with respect to the tray 69 can be adjusted at predetermined intervals. Therefore, the placement position of the medium with respect to the tray 69 can be changed, and the weight of the tray 69 can be reduced.

(30) The positioning section 72 has a line-symmetric shape with respect to the forward and rearward direction Y. Therefore, a medium having line symmetry can be appropriately placed on the support surface 29 by using the positioning section 72. Therefore, operability for the user can be improved.

(31) The positioning section 72 includes a positioning reference section 75 at a position line-symmetric with respect to the forward and rearward direction Y. Therefore, the medium can be appropriately placed on the placement surface while visually checking the positioning reference section 75. Therefore, operability for the user can be improved.

(32) The positioning section 72 includes an expanding and contracting section 74 that can expand and contract according to a shape of the medium. Therefore, it is possible to change the placement position of the medium with respect to the tray 69 using the expanding and contracting section 74. Therefore, the placement position of the medium with respect to the tray 69 can be changed, and the weight of the tray 69 can be reduced.

(33) The expanding and contracting section 74 can expand and contract in an expansion and contraction direction parallel to the support surface 29. Therefore, the placement position of the medium can be adjusted in an expansion and contraction direction parallel to the support surface 29. Therefore, the placement position of the medium with respect to the tray 69 can be changed, and the weight of the tray 69 can be reduced.

(34) The expanding and contracting section 74 can expand and contract in a direction including a component of the width direction X. Therefore, the placement position of the medium can be adjusted in a direction including a component of the width direction X. Therefore, the placement position of the medium with respect to the tray 69 can be changed, and the weight of the tray 69 can be reduced.

Modifications

The present embodiment can be modified as follows. The present embodiment and the following modifications can be implemented in combination with each other within a range that is not technically contradictory.

Figure 20:
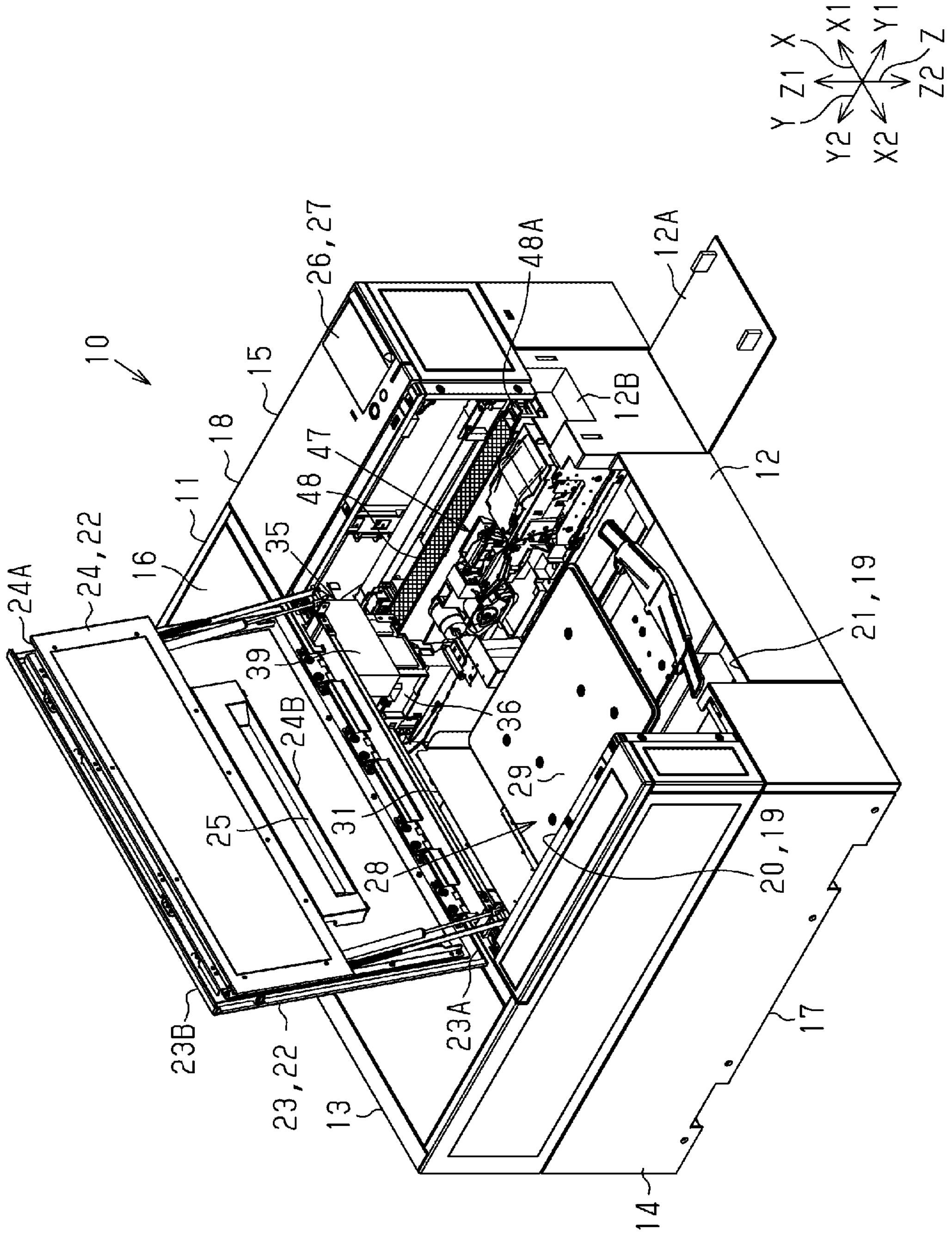
FIG. 20 is a perspective view showing the printing device.

As shown in FIG. 20, the housing 11 may include a front surface cover 12A. The front surface cover 12A is attachable to and detachable from the housing frame 18 at the front surface 12. The housing 11 may be provided with a cutout 12B. The cutout 12B is exposed on the front surface 12 side when the front surface cover 12A is removed from the front surface 12. The cutout 12B is configured to extend toward the rearward direction Y2. The cutout 12B is configured so as to expose one end section 48A of the flushing section 48 when viewed in a front view. One end section 48A of the flushing section 48 is an end section in the forward direction Y1. One end section 48A of the flushing section 48 includes a removal section for a user to remove the flushing section 48. Since the cutout 12B is provided in this manner, even if the flushing section 48 is provided at a position separated from the front surface 12 in the rearward direction Y2, the flushing section 48 can be easily removed from the forward direction Y1 side.

The housing 11 may include a rear surface cover (not shown). The rear surface cover is attachable to and detachable from the housing frame 18 on the rear surface 13. The control substrate 52 may be covered with the rear surface cover, and may be exposed by removing the rear surface cover. Thus, maintenance of the control substrate 52 becomes possible.

The housing 11 may include a left side surface cover (not shown). The left side surface cover can be attached to and detached from the housing frame 18 on the left side surface 14. The liquid supply section 32 may be covered with the left side surface cover, and may be exposed by removing the left side surface cover. Thus, maintenance of the liquid supply section 32 becomes possible. The liquid supply section 32 may be covered with the left side surface cover and the rear surface cover, and may be exposed by removing the left side surface cover and the rear surface cover.

The housing 11 may include a right side surface cover (not shown). The right side surface cover can be attached to and detached from the housing frame 18 on the right side surface 15. The power supply unit 54 may be covered with the right side surface cover, and may be exposed by removing the right side surface cover. Thus, maintenance of the power supply unit 54 becomes possible.

The first opening section 20 may have a shape having the same length as the support surface 29 in the forward and rearward direction Y or a shape longer than the support surface 29 in the forward and rearward direction Y in plan view. The first opening section 20 may have a shape having the same length as the support surface 29 in the width direction X or a shape shorter than the support surface 29 in the width direction X in plan view.

The first opening section 20 and the second opening section 21 may not be configured to be continuous, but may be provided separately. The opening section 19 may be provided without extending across the top surface 16 and the front surface 12.

The opening section 19 may be provided across the top surface 16, the front surface 12, and the other surfaces. That is, the opening section 19 may be provided across at least the top surface 16 and the front surface 12. The opening section 19 is provided in the top surface 16, and may not be provided in the front surface 12. In other words, the opening section 19 may be provided at least on the top surface 16.

The opening and closing detection section 63 may be configured to detect an opening and closing state of the second opening and closing cover 24. Thus, it is possible to perform an operation in accordance with the opening and closing state of the second opening and closing cover 24. Therefore, operability for the user can be improved. The opening and closing detection section 63 may include a first opening and closing detection section that detects an opening and closing state of the second opening and closing cover 24 and a second opening and closing detection section that detects an opening and closing state of the second opening and closing cover 24.

The support surface 29 is configured so as not to move in the horizontal direction, but may be finely adjustable in the horizontal direction only when, for example, printing is not performed, and may be configured so as not to move in the horizontal direction at least when printing is performed.

The first opening section 20 may have a shape that is longer than the support surface 29 in the forward and rearward direction Y when viewed from the upward direction Z1.

When the medium is placed on the support surface 29, a region of the medium may be temporarily placed on a top surface of the liquid supply section 32, and then a region of the medium may be accommodated in the medium accommodation section 30. Thus, the medium can be appropriately placed on the support surface 29. A placement reference section serving as a reference when a partial region of the medium is placed may be provided on a top surface of the liquid supply section 32 or the like. The placement reference section may be, for example, a scale or the like whose dimension can be specified, and it is desirable that the placement reference section is capable of being specified by a user as to whether a position of a placed medium is appropriate.

The position adjustment section 62 may move the support surface 29 from the placement position to the printing position when maintenance is performed in a state where printing is not being performed. The position adjustment section 62 may continuously arrange the support surface 29 at the printing position when maintenance such as flushing is performed in a state where printing is being performed.

The position adjustment section 62 may adjust a position of the support surface 29 in the vertical direction Z from the printing position to the placement position when the opening and closing cover 22 opens the opening section 19. The position adjustment section 62 may adjust a position of the support surface 29 in the vertical direction Z from the placement position to the printing position when the opening and closing cover 22 closes the opening section 19.

The printing section 35 may eject liquid of one color or liquid of a plurality of colors in one printing instruction. In one printing instruction, the printing section 35 may perform printing when the head 36 is moved over a plurality of times in the forward and rearward direction Y. As a specific example, when one printing instruction is input, the printing section 35 may eject white liquid in accordance with a first movement in the rearward direction Y2, and eject liquid of a color other than white in accordance with a second and subsequent movements in the rearward direction Y2. In this case, although the position adjustment section 62 adjusts a position of the support surface 29 in the vertical direction Z during a first movement in the forward direction Y1, the position adjustment section 62 may adjust a position of the support surface 29 in the vertical direction Z during a second and subsequent movements in the forward direction Y1. The control section 53 may determine that an error has occurred when an interfering object was detected during the second or subsequent movement in the forward direction Y1. The control section 53 may determine that an error has occurred when an interfering object was detected, even if a position of the support surface 29 in the vertical direction Z is adjusted during the first movement in the forward direction Y1.

The printing section 35 may perform printing when the head 36 moves in either the forward direction Y1 or the rearward direction Y2, or may perform printing both when the head 36 moves in the forward direction Y1 and when the head 36 moves in the rearward direction Y2.

The printing section 35 may perform printing when the head 36 moves in either the first width direction X1 or the second width direction X2, or may perform printing both when the head 36 moves in the first width direction X1 and when the head 36 moves in the second width direction X2.

The head 36 may include a nozzle surface 38 that is parallel to the horizontal plane or may include a nozzle surface 38 that is inclined with respect to the horizontal plane.

The maintenance section 47 may not include at least one of the flushing section 48, the wiping section 49, the suction section 50, and the waste liquid tank 51.

The position changing section 73 may be capable of changing the placement position of the medium with respect to the tray 69 in a direction including a component of the forward and rearward direction Y. The position changing section 73 may be capable of changing the placement position of the medium with respect to the tray 69 in the width direction X.

The expanding and contracting section 74 may be expandable and contractable in a direction including a component of the width direction X, or may be expandable and contractable in the width direction X. The expanding and contracting section 74 may be capable of expanding and contracting in a direction intersecting with a direction in which the position changing section 73 changes the placement position of the medium with respect to the tray 69. The expanding and contracting section 74 may be adjustable at predetermined intervals in the same manner as the position changing section 73.

The positioning reference section 75 may be able to specify at least one of the central position of the medium and a position which is line-symmetrical from the central position of the medium. The positioning reference section 75 may be visually checkable, and for example, may be provided with a mark whose position can be specified, or may have a shape whose position can be specified. The positioning reference section 75 may not be provided on the position changing section 73. The positioning section 72 may not include at least one of the position changing section 73, the expanding and contracting section 74, and the positioning reference section 75.

The relationship between the width direction X and the forward and rearward direction Y in the present embodiment may be changed. That is, the width direction X of the present embodiment may be a forward and rearward direction Y, and the forward and rearward direction Y of the present embodiment may be a width direction X.

The medium is not limited to, for example, a T-shirt or a polo shirt, but may be, for example, a sweatshirt or a hooded sweatshirt, or may be a medium as clothing. In addition, although a flexible medium is adopted as the medium, the disclosure is not limited to this, and a medium having no flexibility, such as a smartphone case which is printed using UV ink, may be adopted.

The printing device 10 may be configured to eject ink as an example of liquid, or may be configured to eject liquid other than ink. In other words, the liquid can be arbitrarily selected as long as it can print on the medium by being deposited on the medium. The printing device 10 performs printing on a medium by ejecting liquid onto the medium, but the disclosure is not limited to this, and printing on the medium may be performed, for example, by a laser method.

The expression "at least one" as used herein means one or more of the desired alternatives. As an example, the expression "at least one" as used herein means only one option or both of two options if the number of options is two. As another example, the expression "at least one" as used herein means only one option or any combination of two or more options if the number of options is three or more.

Notes

Hereinafter, technical ideas grasped from the above-described embodiment and modifications, and operations and effects thereof, will be described.

(A) A printing device includes a printing section configured to perform printing on a medium and a tray support section that supports a tray including a placement surface configured to support the medium, wherein the tray support section includes a positioning section that determines a placement position of the medium with respect to the tray.

According to this configuration, a positioning section that determines a placement position of a medium with respect to a tray is provided on a tray support section that supports the tray. Therefore, the weight of the tray can be reduced.

(B) In the printing device, the positioning section may include a position changing section configured to change the placement position of the medium with respect to the tray.

According to this configuration, a position changing section is provided in the positioning section. Therefore, the placement position of the medium on the tray can be changed, and the weight of the tray can be reduced.

(C) The printing device may include a housing that accommodates the printing section and the tray support section, wherein the housing may include a first surface parallel to the placement surface, an opening section provided at least on the first surface, and an opening and closing cover configured to open and close the opening section; and the position changing section may be configured to change the placement position of the medium with respect to the tray in a direction parallel to the first surface.

According to this configuration, the placement position of the medium can be adjusted in a direction parallel to the placement surface. Therefore, the placement position of the medium on the tray can be changed, and the weight of the tray can be reduced.

(D) The printing device may include a housing that accommodates the printing section and the tray support section, wherein the housing may include a first surface parallel to the placement surface, a second surface intersecting the first surface, an opening section provided across at least the first surface and the second surface, and an opening and closing cover configured to open and close the opening section and the position changing section may be configured to change the placement position of the medium with respect to the tray in a direction parallel to the first surface and intersecting the second surface.

According to this configuration, the placement position of the medium can be adjusted in a direction parallel to the placement surface. Therefore, the placement position of the medium on the tray can be changed, and the weight of the tray can be reduced.

(E) In the printing device, the tray support section may include a main body section and the position changing section may be configured to change positions of the main body section and the positioning section at predetermined intervals.

According to this configuration, it is possible to adjust the placement position of the medium with respect to the tray at predetermined intervals. Therefore, the placement position of the medium with respect to the tray can be changed by predetermined intervals, and the weight of the tray can be reduced.

(F) In the printing device, the positioning section may have a line-symmetric shape with respect to a predetermined direction parallel to the placement surface.

According to this configuration, a medium having line symmetry can be appropriately placed on the placement surface by using the positioning section. Therefore, operability for the user can be improved.

(G) In the printing device, the positioning section may include a positioning reference section at a position line-symmetric with respect to a predetermined direction parallel to the placement surface.

According to this configuration, the medium can be appropriately placed on the placement surface while visually checking the positioning reference section. Therefore, operability for the user can be improved.

(H) In the printing device, the positioning section may include an expanding and contracting section configured to expand and contract according to a shape of the medium.

According to this configuration, it is possible to change the placement position of the medium with respect to the tray using the expanding and contracting section. Therefore, the placement position of the medium on the tray can be changed, and the weight of the tray can be reduced.

(I) In the printing device, the expanding and contracting section may be configured to expand and contract in an expanding and contracting direction parallel to the placement surface.

According to this configuration, the placement position of the medium can be adjusted in a direction parallel to the placement surface. Therefore, the placement position of the medium on the tray can be changed, and the weight of the tray can be reduced.

(J) The printing device may include a housing that accommodates the printing section and the tray support section, wherein the housing may include a first surface parallel to the placement surface, a second surface intersecting the first surface, an opening section provided across at least the first surface and the second surface, and an opening and closing cover configured to open and close the opening section and the expanding and contracting section may be configured to expand and contract in a direction including a component of a first direction parallel to the first surface and the second surface.

According to this configuration, the placement position of the medium can be adjusted in a direction including a component of a first direction. Therefore, the placement position of the medium on the tray can be changed, and the weight of the tray can be reduced.

What is claimed is:

1. A printing device comprising:

a printing section configured to perform printing on a medium;

a tray support section that supports a tray including a placement surface configured to support the medium; and a housing that accommodates the printing section and the tray support section, wherein the tray support section includes a positioning section that determines a placement position of the medium with respect to the tray, the positioning section includes a position changing section configured to change the placement position of the medium with respect to the tray, the housing includes a first surface parallel to the placement surface, a second surface intersecting the first surface, an opening section provided across at least the first surface and the second surface, and an opening and closing cover configured to open and close the opening section, and the position changing section is configured to change the placement position of the medium with respect to the tray in a direction parallel to the first surface and intersecting the second surface.

2. The printing device according to claim 1, wherein the tray support section includes a main body section; and the position changing section is configured to change positions of the main body section and the positioning section at predetermined intervals.

3. The printing device according to claim 1, wherein the positioning section has a line-symmetric shape with respect to a predetermined direction parallel to the placement surface.

4. The printing device according to claim 1, wherein the positioning section includes a positioning reference section at a position line-symmetric with respect to a predetermined direction parallel to the placement surface.

5. The printing device according to claim 1, wherein the positioning section includes an expanding and contracting section configured to expand and contract according to a shape of the medium.

6. The printing device according to claim 5, wherein the expanding and contracting section is configured to expand and contract in an expanding and contracting direction parallel to the placement surface.

7. The printing device according to claim 5, wherein the expanding and contracting section is configured to expand and contract in a direction including a component of a first direction parallel to the first surface and the second surface.

* * * * *